United States Patent
Rosu et al.

(10) Patent No.: US 12,474,442 B2
(45) Date of Patent: Nov. 18, 2025

(54) DOPPLER DIVISION MULTIPLEXING (DDM) MULTIPLE-INPUT MULTIPLE-OUTPUT (MIMO) RADAR SYSTEM AND DECODING METHOD

(71) Applicant: NXP B.V., Eindhoven (NL)

(72) Inventors: Filip Alexandru Rosu, Bucharest (RO); Adriana Brigalda, Bucharest (RO); Daniel Silion, Bucharest (RO)

(73) Assignee: NXP B.V., Eindhoven (NL)

( * ) Notice: Subject to any disclaimer, the term of this patent is extended or adjusted under 35 U.S.C. 154(b) by 310 days.

(21) Appl. No.: 18/450,936

(22) Filed: Aug. 16, 2023

(65) Prior Publication Data
US 2025/0052861 A1   Feb. 13, 2025

(30) Foreign Application Priority Data

Aug. 9, 2023   (RO) .............................. a 2023 00438

(51) Int. Cl.
*G01S 7/35*   (2006.01)
*G01S 13/58*  (2006.01)

(52) U.S. Cl.
CPC ............ *G01S 7/354* (2013.01); *G01S 13/584* (2013.01)

(58) Field of Classification Search
CPC ........ G01S 7/354; G01S 13/584; G01S 13/42; G01S 13/931
See application file for complete search history.

(56) References Cited

U.S. PATENT DOCUMENTS

2021/0333386 A1*  10/2021  Park ................. G01S 7/356
2022/0171049 A1    6/2022  Wu et al.
2023/0243951 A1*  8/2023  Jeannin ............. G01S 13/58
                                                         342/22

(Continued)

FOREIGN PATENT DOCUMENTS

EP       4009074 A1    6/2022

OTHER PUBLICATIONS

F. G. Jansen, "Automotive Radar Doppler Division MIMO With Velocity Ambiguity Resolving Capabilities," 2019 16th European Radar Conference (EuRAD), 2019, pp. 245-248.

*Primary Examiner* — Bernarr E Gregory
*Assistant Examiner* — Kenneth W Good
(74) *Attorney, Agent, or Firm* — Andrew C. Milhollin

(57) ABSTRACT

A radar system may include transmitter modules configured to transmit multiple transmit signals in accordance with a Doppler Domain Multiplexing (DDM) scheme, receiver modules configured to receive reflections from the plurality of transmit signals reflected off an object and to generate corresponding digital signals, and a signal processor configured to generate a range-Doppler antenna cube representing the digital signals, and, for each of range bin of the cube, to generate a decoded range-Doppler bit map (RDBM) from the range-Doppler antenna cube by generating decoded RDBM rows by extracting a range bin matrix, performing a Discrete Fourier Transform on range bin matrix to generate an output matrix, determining peak locations in the output matrix, comparing associated peak locations across transmit channels of the output matrix to identify location-matched peaks associated with the Doppler bin, and generating a decoded RDBM row based on the location-matched peaks.

20 Claims, 10 Drawing Sheets

(56) References Cited

U.S. PATENT DOCUMENTS

2023/0305103 A1     9/2023   Nam et al.
2024/0210568 A1*    6/2024   Elad ..................... G01S 13/288
2024/0402324 A1*   12/2024   Scherz ................... G01S 7/35

* cited by examiner

DOPPLER DIVISION MULTIPLEXING (DDM) MULTIPLE-INPUT MULTIPLE-OUTPUT (MIMO) RADAR SYSTEM AND DECODING METHOD

CROSS-REFERENCE TO RELATED APPLICATIONS

This application claims priority under 35 U.S.C. § 119 to Romanian patent application no. a2023 00438, filed Aug. 9, 2023, the contents of which are incorporated by reference herein.

TECHNICAL FIELD

Embodiments of the subject matter described herein relate generally to radar systems, including Doppler division multiplexing (DDM) multiple-input multiple-output (MIMO) radar systems and associated decoding techniques.

BACKGROUND

Radar systems may be used to detect the range, velocity, and angle of nearby objects. With advances in technology, radar systems may now be applied in many different applications, such as automotive radar safety systems which increasingly use radar systems to detect changes to a surrounding environment, such as a proximity to another automobile for blind spot detection, or for detection of a leading vehicle for improved cruise control. Accurate radar detection is also integral to autonomous vehicle control systems. However, there are challenges with accurately detecting the position and movement of objects using radar systems that can be constructed on an automobile. A common method for improving the angular resolution of automotive radar systems uses multiple transmit and receive antennas to implement a Multiple-Input-Multiple-Output (MIMO) automotive radar system. In a MIMO radar system, a virtual array is formed with multiple array elements equal to a product of a number of transmit and receive antennas. The increased aperture of a MIMO radar compared to a single transmitter system increases the capability to separate objects based upon the Angle of Arrival (AoA) of signals reflected by those objects.

SUMMARY

A brief summary of various exemplary embodiments is presented below. Some simplifications and omissions may be made in the following summary, which is intended to highlight and introduce some aspects of the various exemplary embodiments, without limiting the scope. Detailed descriptions of an exemplary embodiment adequate to allow those of ordinary skill in the art to make and use these concepts will follow in later sections.

In an example embodiment, a radar system may include transmitter modules configured to transmit multiple transmit signals in accordance with a Doppler Domain Multiplexing (DDM) scheme, receiver modules configured to receive reflections of the multiple transmit signals reflected by at least one object and to generate digital signals based on the received reflections, and a signal processor. The signal processor may be configured to generate a range-Doppler antenna cube representing the digital signals, the range-Doppler antenna cube including at least multiple range bins and multiple Doppler bins. The signal processor may be configured to, for each range bin of the multiple range bins of the range-Doppler antenna cube, extract a range bin matrix from the range-Doppler antenna cube, perform a Discrete Fourier transform (DFT) of each range-Doppler cell of the range bin matrix in a channel dimension to generate an output matrix, determine peak locations in the output matrix, compare, for each Doppler bin, associated peak locations across all transmit channels represented in the output matrix to identify location-matched peaks associated with the Doppler bin, and generate a decoded RDBM row based on the location-matched peaks. The signal processor may be configured to generate a decoded RDBM based on the decoded RDBM rows.

In one or more embodiments, the signal processor, to generate the decoded RDBM row, may be further configured to generate, for each of the Doppler bins of the output matrix, a binary value indicating whether a quantity of location-matched peaks associated with that Doppler bin exceeds a predetermined threshold.

In one or more embodiments, the signal processor, to determine the peak locations of the output matrix, may be further configured to, for each particular Doppler bin of the output matrix determine a maximum value, compare cell values of the particular Doppler bin to the determined maximum value, in response to first cells of the particular Doppler bin having values greater than or equal to the determined maximum value, update the cell values of the first cells to be equal to a predetermined value, and in response to second cells of the particular Doppler bin having values less than the determined maximum value, update the cell values of the second cells to be equal to zero. The signal processor may be further configured to generate a first matrix based on the updated cell values for each particular Doppler bin of the output matrix.

In one or more embodiments, the signal processor, to compare the associated peak locations, is further configured to generate a second matrix that includes groups of Doppler bins. Each group of Doppler bins may include columns of the first matrix representing each of the transmit channels.

In one or more embodiments, the columns of each group of the second matrix, adjusted for transmit channel offsets in a Doppler dimension, correspond to the same unambiguous velocity. The transmit channel offsets are defined according to associated DDM codes.

In one or more embodiments, the signal processor, to generate the decoded RDBM row, is further configured to generate a third matrix by calculating a scalar product of cells in each row of each group of the second matrix. Results of the scalar products for a given group of the second matrix may form a corresponding column of the third matrix.

In one or more embodiments, the signal processor, to generate the third matrix, is further configured to apply, a coefficient of $1/N_{ch}$ to the result of each scalar product, where $N_{ch}$ is the number of transmit channels represented in the range-Doppler antenna cube.

In one or more embodiments, the signal processor, to generate the decoded RDBM row, is further configured to generate a fourth matrix by applying a threshold to each cell of the third matrix, such that cells of the third matrix having values greater than the threshold are set to 1 in the fourth matrix, and cells of the third matrix having values less than the threshold are set to 0 in the fourth matrix.

In one or more embodiments, the threshold is equal to the predetermined value. In one or more other embodiments, the threshold is less than the predetermined value.

In one or ore embodiments, the signal processor, to generate the decoded RDBM row, is configured to generate the decoded RDBM row as an array of per-column maximum values of the fourth matrix.

In an example embodiment, a method includes steps of generating, by a signal processor of a radar system, a range-Doppler antenna cube representing digital signals corresponding to signals reflected by an object, the range-Doppler antenna cube including at least multiple range bins and multiple Doppler bins, and generating, by the signal processor, a decoded range-Doppler bit map (RDBM). Generating the decoded RDBM may include steps of, for each range bin of the multiple range bins of the range-Doppler antenna cube, extracting a range bin matrix from the range-Doppler antenna cube, performing a Discrete Fourier transform of each range-Doppler cell of the range-Doppler antenna cube to generate an output matrix, determining peak locations in each Doppler bin of the output matrix, comparing, for each of the Doppler bins of the output matrix, associated peak locations across all transmit channels represented in the output matrix to identify location-matched peaks associated with the Doppler bin, generating a decoded RDBM row based on the location-matched peaks in each Doppler bin, and combining the decoded RDBM rows to generate the decoded RDBM.

In one or more embodiments, generating the decoded RDBM row further includes generating, for each of the Doppler bins of the output matrix, a binary value indicating whether a quantity of location-matched peaks associated with that Doppler bin exceeds a predetermined threshold.

In one or more embodiments, determining the peak locations in each Doppler bin of the output matrix includes, for each particular Doppler bin of the output matrix, determining a maximum value of the particular Doppler bin, comparing cell values of the particular Doppler bin to the determined maximum value, in response to first cells of the particular Doppler bin having values greater than or equal to the determined maximum value, updating the cell values of the first cells to be equal to a predetermined value, and in response to second cells of the particular Doppler bin having values less than the determined maximum value, updating the cell values of the second cells to be equal to a predetermined value, and generating a first matrix based on the updated cell values for each particular Doppler bin of the output matrix.

In one or more embodiments, comparing the associated peak locations further includes generating a second matrix that includes groups of columns of the first matrix. The columns of each group may correspond to the same unambiguous velocity, adjusted for transmit channel offsets in a Doppler dimension. The transmit channel offsets may be defined according to associated DDM codes.

In one or more embodiments, generating the decoded RDBM row further includes generating a third matrix by calculating a scalar product of cells in each row of each group of the second matrix. Results of the scalar products for a given group of the second matrix may form a corresponding column of the third matrix. Generating the decoded RDBM row further includes applying a coefficient of $1/N_{ch}$ to the result of each scalar product, where $N_{ch}$ is the number of transmit channels represented in the range-Doppler antenna cube.

In one or more embodiments, generating the decoded RDBM row further includes generating a fourth matrix by applying a threshold to each cell of the third matrix, such that cells of the third matrix having values greater than the threshold are set to 1 in the fourth matrix and cells of the third matrix having values less than the threshold are set to 0 in the fourth matrix.

In one or more embodiments, the threshold is equal to the predetermined value. In one or more other embodiments, the threshold is less than the predetermined value.

In one or more embodiments, generating the decoded RDBM row further includes generating the decoded RDBM row as an array of per-column maximum values of the fourth matrix.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein:

DETAILED DESCRIPTION

Figure 1:
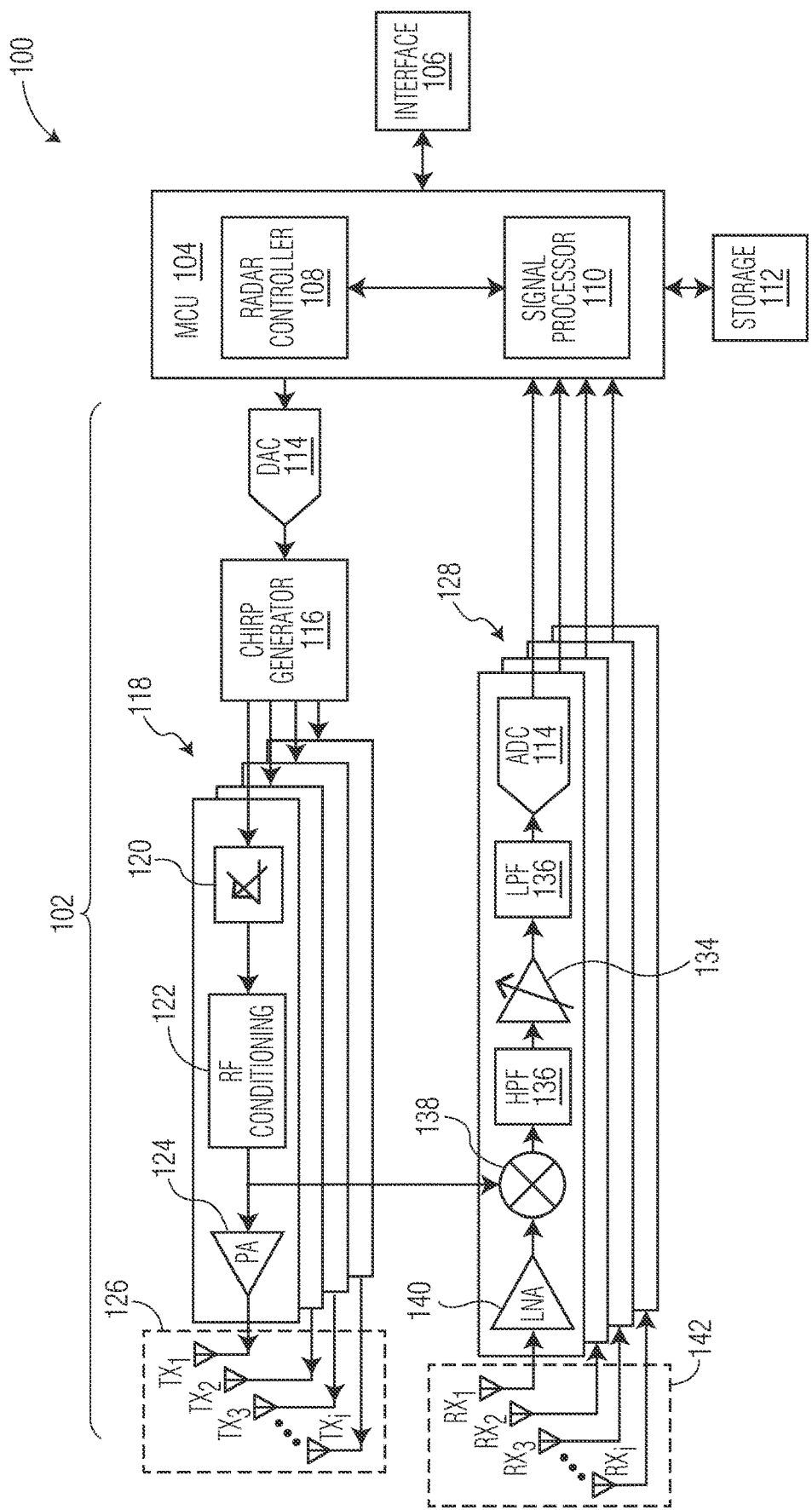
FIG. 1 is a block diagram illustrating an example radar system, in accordance with one or more embodiments.

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted for sake of brevity. Additionally, elements in the drawing figures are not necessarily drawn to scale. For example, the dimensions of some of the elements or regions in the figures may be exaggerated relative to other elements or regions to help improve understanding of embodiments described herein.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term "coupled," as used herein, is defined as directly or indirectly connected in an electrical or non-electrical manner. As used herein the terms "substantial" and "substantially" mean sufficient to accomplish the stated purpose in a practical manner and that minor imperfections, if any, are not significant for the stated purpose. As used herein, the words "exemplary" and "example" mean "serving as an example, instance, or illustration." Any implementation described herein as exemplary or an example is not necessarily to be construed as preferred or advantageous over other implementations.

Directional references such as "top," "bottom," "left," "right," "above," "below," and so forth, unless otherwise stated, are not intended to require any preferred orientation and are made with reference to the orientation of the corresponding figure or figures for purposes of illustration.

For the sake of brevity, conventional semiconductor fabrication techniques may not be described in detail herein. In addition, certain terms may also be used herein for reference only, and thus are not intended to be limiting. For instance, the terms "first", "second", and other such numerical terms referring to structures do not imply a sequence or order unless clearly indicated by the context.

Various embodiments described herein relate to Doppler Division Multiplexing (DDM) Multiple-Input Multiple-Output (MIMO) radar systems with integrated object tracking capabilities, which utilize a decoding technique that leverages Angle of Arrival (AoA) information. Conventional decoding solutions for use with DDM MIMO radar systems rely on constant false alarm rate (CFAR) detection and do not make use of AoA information. DDM decoding techniques described herein use spatial information as a decoding parameter and do not require conventional simple threshold comparison or peak detection steps. The speed at which DDM decoding can be performed using embodiments of the DDM decoding techniques described herein may be advantageously improved compared to that of conventional decoding techniques that rely on, for example, CFAR detection. Further, embodiments of the DDM decoding techniques described herein may be less susceptible to phase noise compared to conventional techniques, due at least in part to the omission of conventional peak-detection and threshold-detection based techniques.

One or more embodiments of the DDM decoding techniques described herein have analytical closed form solutions for the probability of false alarm. Further, the statistical application of spatial information in the present DDM decoding techniques may result in comparatively lower probabilities of false alarm compared to conventional decoding and detection techniques.

In one or more embodiments, a radar system includes a microcontroller unit (MCU) having a signal processor configured to generate a range-Doppler antenna cube from, for example, raw ADC samples derived from return signals (i.e., reflections) corresponding to reflections of transmit signals (e.g., chirps) transmitted via transmitter (TX) antenna elements of the radar system (e.g., in accordance with a Doppler division scheme having, for example, a uniform pulse repetition interval (PRI)), where the return signals are received via receiver (RX) antenna elements of the radar system. For example, the range-Doppler antenna cube may be generated by performing range compression (e.g., in the form of a fast-time Fast Fourier transform (FFT)) and Doppler compression (e.g., in the form of a slow-time FFT) on raw ADC samples output by one or more ADCs of receiver modules of the radar system. The signal processor may then perform per-channel Angle of Arrival (AoA) estimation by performing a channel dimension FFT for each range-Doppler cell of the range-Doppler antenna cube to generate a respective FFT output matrix for each range bin. The signal processor may then perform DDM decoding based on the FFT output matrices to generate a decoded range-Doppler bit map (RDBM), where each row of the RDBM corresponds to a respective FFT output matrix of the FFT output matrices and, therefore, a respective range bin of the range-Doppler antenna cube. While one or more embodiments described herein involve the use of FFTs, it should be understood that this is intended to be illustrative and not limiting. Other suitable techniques for carrying out Discrete Fourier Transforms (DFTs) may instead be used in accordance with one or more other embodiments.

Standard DDM MIMO technology implies having all transmitters active in the same time-frame, with each transmitter having a respectively different self-induced chirp-to-chirp phase rotation, while maintaining a common and constant Pulse Repetition Frequency (PRF). This results in a sequence of signals being transmitted from each transmitter module that are orthogonal in the Doppler domain, such that the return signal received from each target is replicated at a different velocity in the Doppler domain, depending on the transmitter module (or TX channel) associated with the return signal. These replications depend on the DDM code, and the order of the replicas is required to be known in order to correctly construct the MIMO array. Finding the order of such replicas is what is considered herein as "decoding" and is equivalent to finding the unambiguous velocity of the target within the $$\pm \frac{1}{2T_R}$$

unambiguous Doppler range, where $T_R$ is the Pulse Repetition Interval (PRI).

The DDM decoding process may include generating a decoded RDBM row for each range bin of the input range-Doppler antenna cube by generating an array of maximum values for each column (i.e., Doppler bin) of the FFT output matrix corresponding to that range bin, generating a "MAX" map based on the FFT output matrix and the array of maximum values, generating an aligned MAX map that includes groups of columns (i.e., Doppler bin data) of the MAX map, each group including respective columns for each TX channel represented in the FFT output matrix and corresponding to a respective Doppler bin of the FFT output matrix, generating a combined MAX map based on per-angle-bin average maximum values for each group, generating a filtered MAX map by applying a threshold to all elements of the combined MAX map, and generating a decoded RDBM row based on the filtered MAX map. The signal processor may then output a decoded RDBM that is formed from the generated decoded RDBM rows. The decoded RDBM may, for example, include a two-dimensional (2D) array of ones and zeroes, where the width of the decoded RDBM is equal to the number of chirps transmitted per TX channel over the time period being processed. In one or more embodiments, the threshold that the signal processor applies to the combined MAX map to generate the filtered MAX map may be adjusted to change the number of TX channels that are required to be aligned in order to be interpreted as corresponding to a detected target object.

In one or more embodiments, the tolerance for identified maxima in two TX channels within a given group to be designated as "aligned" may be broadened to reduce the likelihood of false negatives. For example, the signal processor may be configured with a broader tolerance, such that identified maxima for two TX channels in a given Doppler bin may be considered aligned if they are disposed in the same or adjacent angle bins (i.e., rather than being limited to only the same angle bin).

FIG. 1 shows a block diagram of a linear chirp DDM MIMO automotive radar system 100 which includes a DDM MIMO radar device 102 connected to a radar microcontroller unit (MCU) 104. In one or more embodiments, the device 102 may be a linear frequency modulation (LFM) DDM MIMO radar device. In one or more embodiments, the DDM MIMO radar device 102 may be embodied as a line-replaceable unit (LRU) or modular component that is designed to be replaced quickly at an operating location. Similarly, the radar MCU 104 may be embodied as a line-replaceable unit (LRU) or modular component. Although a single or mono-static DDM MIMO radar device 102 is shown, it will be appreciated that additional distributed radar devices may be used to form a distributed or multi-static radar. In addition, the depicted radar system 100 may be implemented in integrated circuit form with the DDM MIMO radar device 102 and the radar MCU 104 formed with separate integrated circuits (chips) or with a single chip, depending on the application.

The radar device 102 includes one or more transmitting antenna elements 126 (sometimes referred to herein as "transmit antennas 126") and receiving antenna elements 142 (sometimes referred to herein as "receive antennas 142") connected, respectively, to one or more radio-frequency (RF) transmitter (TX) modules 118 and receiver (RX) modules 128. Each transmit antenna 126 and TX module may be associated with a respective transmit channel of a group of transmit channels designated herein as $TX_1$, $TX_2$, $TX_3$, ... $TX_i$, where "i" is the total number of transmit (TX) channels. Each receive antenna 142 and RX module 128 may be associated with a respective receive channel of a group of receive channels designated herein as $RX_1$, $RX_2$, $RX_3$, ... $RX_j$, where "j" is the number of receive (RX) channels. As a non-limiting example, a radar device (e.g., the radar device 102) can include individual antenna elements (e.g., antenna elements 126) connected, respectively, to four transmitter modules (e.g., the transmitter modules 118) and sixteen receiver modules (e.g., the receiver modules 128). These quantities of transmitter and receiver antenna elements and modules are intended to be illustrative and not limiting, with other quantities of these elements being possible in one or more other embodiments, such as four transmitter modules 118 and six receiver modules 128, or a single transmitter module 118 and/or a single receiver module 128. The radar device 102 includes a chirp generator 116, which is configured to supply chirp input signals to the transmitter modules 118. To this end, the chirp generator 116 is configured to receive input program and control signals, including, as non-limiting examples, a reference local oscillator (LO) signal, a chirp start trigger signal, and program control signals, from the MCU 104 via a digital-to-analog converter 114. The chirp generator 116 is configured to generate chirp signals and send the chirp signals to the transmitter modules 118 for transmission via the transmitting antenna elements 126. In one or more embodiments, each transmitter module includes a phase rotator 120 (sometimes referred to herein as a "phase shifter 120") that is configured to apply phase coding to the chirp signals, where the phase rotator 120 is controlled by program control signals generated by the MCU 104. The phase rotator 120 may provide a uniform phase shift between transmitter modules 118 in one or more embodiments. The phase rotator 120 may alternatively provide each transmitter module 118 with the ability to implement progressive phase shifting using a non-uniform coding technique, in accordance with one or more other embodiments. Each transmitter module 118 includes a RF conditioning module 122 that is configured to filter the phase-coded chirp signals. Each transmitter module 118 includes a power amplifier 124 configured to amplify the filtered, phase-coded chirp signal before they are provided to and transmitted via one or more corresponding transmitting antenna elements 126. By using each transmit antenna 126 to transmit progressively phase shifted sequences of chirp signals, each transmitter module 118 operates in a Doppler Division Multiplexing fashion with other transmitter modules of the transmitter modules 118 because they are programmed to simultaneously transmit identical waveforms on a phase-separated schedule. Herein, a transmitted chirp signal is sometimes referred to as a "transmit signal".

The radar signal transmitted by the transmitter antenna modules 118 may by reflected by an object in an environment of the radar device 102, and part of the reflected radar signal, sometimes referred to herein as a "return signal" or a "reflection", is received by the receiver antenna modules 128 at the radar device 102. At each receiver module 128, the received (radio frequency) antenna signal is amplified by a low noise amplifier (LNA) 140 and then fed to a mixer 138 where it is mixed with the transmitted chirp signal generated by the RF conditioning module 122. The resulting intermediate frequency signal is fed to a high-pass filter (HPF) 136. The resulting filtered signal is fed to a variable gain amplifier 134, which amplifies the signal before feeding it to a low pass filter (LPF) 132. This re-filtered signal is fed to an analog/digital converter (ADC) 130 and is output by each receiver module 128 (e.g., output to the signal processor 110 of the MCU 104) as a digital signal. In this way, the receiver modules 128 compress the target echo of various delays into multiple sinusoidal tones whose frequencies correspond to the round-trip delay of the echo.

In the radar system 100, the radar MCU 104 may be connected and configured to supply input control signals to the radar device 102 and to receive therefrom digital output signals generated by the receiver modules 128. In one or more embodiments, the radar MCU 104 includes a radar controller 108 and a signal processor 110, where either or both of which may be embodied as a micro-controller unit (MCU) or other processing unit. The radar controller 108 can receive data from the radar device 102 (e.g., from the receiver modules 128) and can control radar parameters of the radar device 102, such as frequency band, length of each radar frame, and the like via the DAC 114. For example, the DAC 114 may be used to adjust the radar chirp signals output from the chirp generator 116 included in the radar device 102. The signal processor 110 may be configured and arranged for signal processing tasks such as, but not limited to, target object identification, computation of the distance or range to a target object, computation of the radial velocity of a target object, and computation of the AoA of signals reflected by a target object, and the like. Herein, the term "AoA" or "Angle-of-Arrival" refers to the angle of a signal (e.g., a radar signal) that is reflected by an object in the environment. The signal processor 110 can provide calculated values associated with such computations to a storage 112 and/or to other systems via an interface 106.

The interface 106 can enable the MCU 104 to communicate with other systems over local and wide area networks, the internet, automotive communication buses, and/or other kinds of wired or wireless communication systems, as non-limiting examples. In one or more embodiments, the MCU 104 can provide the calculated values over the interface 106 to other systems, such as a radar-camera-lidar fusion system; an automated driving assistance system including parking, braking, or lane-change assistance features; and the like. The storage 112 can be used to store instructions for the MCU 104, received data from the radar device 102, calculated values from the signal processor 110, and the like. Storage 112 can be any suitable storage medium, such as a volatile or non-volatile memory.

To control the transmitter modules 118, the radar controller 108 may, for example, be configured to generate transmitter input signals, such as program, control trigger, reference LO signal(s), calibration signals, frequency spectrum shaping signals (such as ramp generation in the case of FMCW radar). The radar controller may, for example, be configured to receive data signals, sensor signals, and/or register programming or state machine signals for RF (radio frequency) circuit enablement sequences. In one or more embodiments, the radar controller 108 may be configured to program the transmitter modules 118 with transmitter input signals to operate in a DDM fashion by progressively phase shifting the LFM chirps to be transmitted by the transmit antenna elements 126. In selected embodiments, the radar controller 108 is configured to progressively phase shift the LFM chirps that are output by the chirp generator 116 with co-prime-coded (CPC) encoding by programming the programmable phase rotator 120 prior to transmission. Each transmitter module 118 emits a transmit channel signal having a different CPC encoded LFM signal generated using a programmable slow-time phase rotator 120, such that the receiver modules 128 can condition the target object return signals (i.e., return signals corresponding to reflections of transmit signals that are transmitted via the transmit antenna elements 126, reflected off of one or more target objects, where the return signals are then received via the receive antenna elements 142) to generate digital domain signals which are processed by the radar MCU 104 to separate and identify the CPC-encoded transmit channel signals.

At each receiver module 128, digital output signals are generated from target return signals for digital processing by the signal processor 110 to construct and accumulate multiple-input multiple-output (MIMO) array vector outputs forming a MIMO aperture for use in computing plots or maps for AoA estimation and target object tracks. In particular, in the signal processor 110, the digital output signals may be processed by one or more fast Fourier transform (FFT) modules or Discrete Fourier Transform (DFT) modules, such as a fast-time (range) FFT module which generates a range chirp antenna cube (RCAC) and a slow-time (Doppler) FFT module which generates a range-Doppler antenna cube. A per-channel AoA estimation module of the signal processor 110 may then perform a respective channel dimension FFT on each range bin of the range-Doppler antenna cube to produce a number of FFT or DFT output matrices (i.e., one per range bin of the range-Doppler antenna cube). A DDM decoder module of the signal processor 110 may then generate a decoded range-Doppler bit map (RDBM) based on the FFT or DFT output matrices, as will be described in more detail, below. The decoded RDBM may be further processed at the by the signal processor 110 to construct a DDM MIMO array vector which the signal processor 110 then processes to perform AoA estimation and target object tracking. The MCU 104 may then output the resulting target tracks (e.g., via the interface 106) to other automotive computing or user interfacing devices for further process or display.

Figure 2:
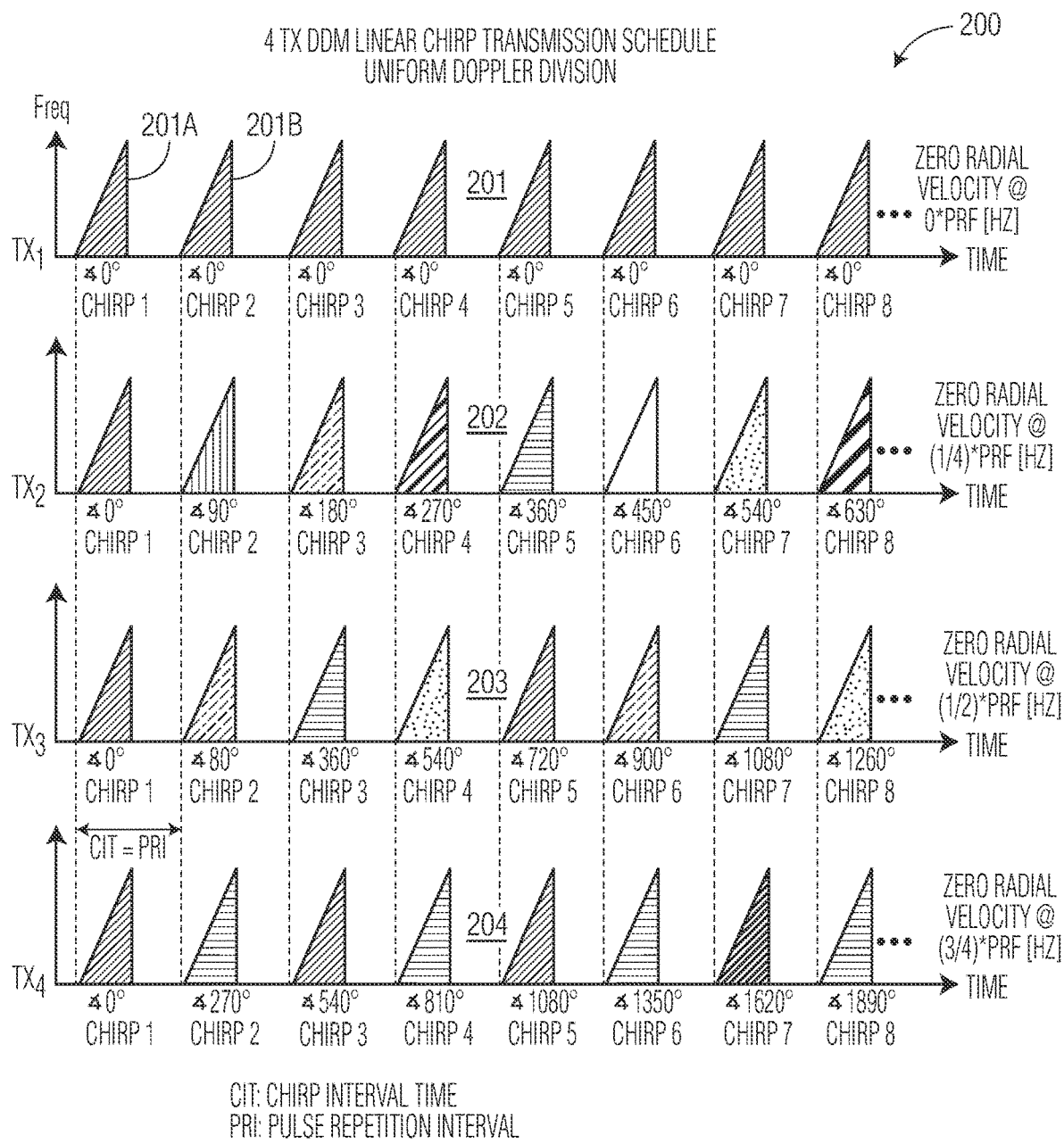
FIG. 2 is a timing diagram illustrating a linear chirp transmission schedule for a Doppler-division multiplexing (DDM) multiple-input multiple-output (MIMO) radar system, in accordance with one or more embodiments.

For a contextual understanding of the operation of a DDM MIMO radar system, such as the radar system 100 of FIG. 1, reference is now made to FIG. 2 which shows a timing diagram 200 illustrating the linear chirp transmission schedules 201, 202, 203, 204 of four transmitters (e.g., each respectively corresponding, in one or more embodiments, to a transmitter module 118 and transmit antenna element 126 of FIG. 1) using a uniform Doppler Division scheme. Each transmitter is associated with a respective transmit channel of the transmit channels $TX_1$-$TX_4$ and is programmed to simultaneously transmit a sequence of DDM linear chirp waveforms in a single radar transmission frame. Each transmitter transmits a linear chirp waveform (e.g., 201A, 201B) at a fixed and uniform pulse repetition frequency (PRF) rate which is the inverse of the pulse repetition interval (e.g., $PRF=PRI^{-1}$) or chirp interval time (e.g., $PRF=CIT^{-1}$). In addition, each transmitter encodes each chirp with an additional progressive phase offset by using the phase rotator in the front-end circuit. As a result of the progressive phase offset coding, each of the received chirps corresponding to reflections of radar signals originating from each distinct transmitter effectively has a distinct zero-radial velocity Doppler shift and the individual target detections can be associated with the corresponding transmitter from which the reflected radar signal originated, which is necessary for the correct functioning of the subsequent MIMO virtual array construction.

The location of the zero-radial velocity is controlled by the progressive phase offset applied to each transmitter's chirp based on the following equation:

$$f_{zrv,i} = \frac{A_i}{2\pi} PRF [\text{Hz}]$$

where $f_{zrv,i}$ is the zero-radial velocity Doppler shift frequency of transmitter-i, and where $A_i$ is the progressive phase shift (radians) between two adjacent chirps. For example, in a 4-TX DDM MIMO radar system, each transmitter could be assigned the following progressive phase offsets and thus the zero-radial velocity frequencies:

$$TX_1 : A_1 = 0 \rightarrow f_{zrv,1} = 0 \text{ [Hz]};$$

$$TX_2 : A_2 = \frac{\pi}{2} \rightarrow f_{zrv,2} = \frac{PRF}{4} \text{ [Hz]};$$

$$TX_3 : A_3 = \pi \rightarrow f_{zrv,3} = \frac{PRF}{2} \text{ [Hz]};$$

$$TX_4 : A_4 = \frac{3\pi}{2} \rightarrow f_{zrv,4} = \frac{3 * PRF}{4} \text{ [Hz]}.$$

In the present example, this result is depicted with the first transmitter, for transmit channel $TX_1$, encoding its chirp waveforms with a progressive phase offset of 0 degrees; the second transmitter, for transmit channel $TX_2$, encoding its chirp waveforms with a progressive phase offset of 90 degrees; the third transmitter, for transmit channel $TX_3$, encoding its chirp waveforms 20 with a progressive phase offset of 180 degrees; and the fourth transmitter, for transmit channel $TX_4$, encoding its chirp waveforms with a progressive phase offset of 270 degrees. In a DDM MIMO radar system with uniform Doppler division, targets can be unambiguously associated to the correct transmitter and TX channel by judging its location within the sectorized Doppler spectrum, provided that the targets have true Doppler shifts within $\pm PRF/(2N_{ch})$ before applying DDM, where $N_{ch}$ is the number of DDM transmitter channels.

Figure 3:
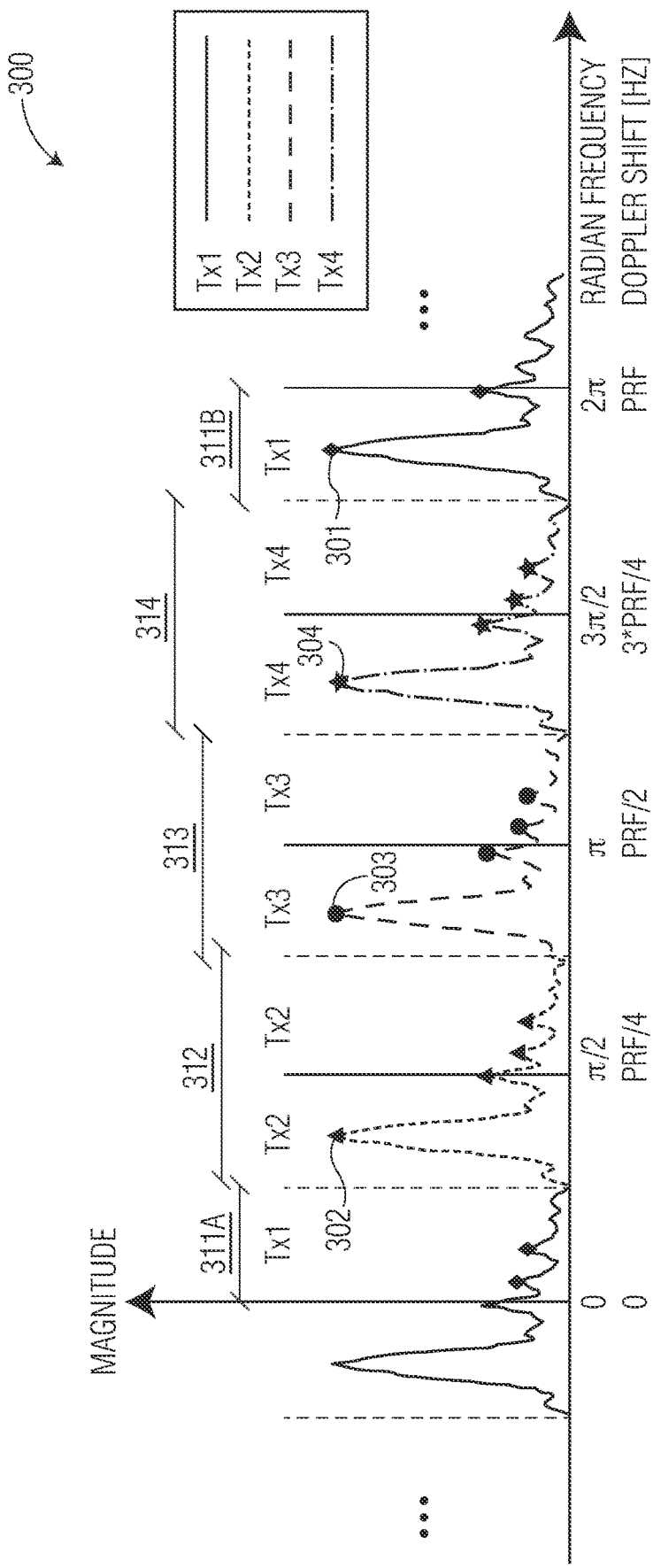
FIG. 3 is a graph illustrating radian frequency Doppler shift versus signal magnitude for detected reflections corresponding to four chirps transmitted concurrently by four different transmitters, respectively, in accordance with one or more embodiments.

To illustrate the principle of Doppler-peak detection and transmitter association, reference is now made to FIG. 3 which depicts a plot of the Doppler spectrum as a function of the radian frequency (and Doppler shift) for a uniform DDM-MIMO radar system (e.g., an example embodiment of the radar system 100 of FIG. 1) where the maximum radial velocity of the targets does not exceed the allocated spectrum budget, resulting in unambiguous association of target peaks and transmit antenna. As depicted, each transmitter channel $TX_1$-$TX_4$ has a respective allocated spectrum section 311, 312, 313, 314 which is effectively centered around a corresponding zero-radial velocity frequency (e.g., 0, π/2, π, and 3π/2). As a result, each target measurement 301, 302, 303, 304 having a true Doppler shift within $\pm PRF/(2N_{ch})$ of the zero-radial velocity frequency for each transmitter channel $TX_1$-$TX_4$ can be unambiguously associated to the correct transmitter by judging its location within the sectorized Doppler spectrum 300. This result holds true while the target's radial speed falls within the allocated spectral budget sections 311, 312, 313, 314 for each transmitter channel $TX_1$-$TX_4$. As shown, the spectral budget section 311 for the transmitter channel $TX_1$ may be split into sections 311A, occurring at the beginning of the period, and 311B, occurring at the end of the period.

With existing 76-81 GHZ fast-chirp automotive radar front-end monolithic microwave integrated circuits (MMICs), the fastest chirp signals are limited by a Chirp Interval Time (CIT) that is no shorter than a period of approximately 15 microseconds. As a result, the maximum unambiguous Doppler radial detection speed is ±65 m/s (or ±234 km/hr), and the entire extent of detectable speed is then divided into $N_{ch}$ sections for $N_{ch}$ transmitters and transmit channels for unambiguous DDM operation, for such radar systems. In a high dynamic drive scene where targets and radar travels at 100 km/hr speed or faster, the extent of the roughly 470 km/hr Doppler spectrum bandwidth is sufficient only for very few transmitters. While more transmitters and DDM transmitter channels could be supported without incurring ambiguity by significantly shortening the CIT to a period on the order of microseconds, it should be noted that such ultra-short chirps provide additional cost and complexity to the radar systems, given such high dynamic drive conditions.

Figure 4:
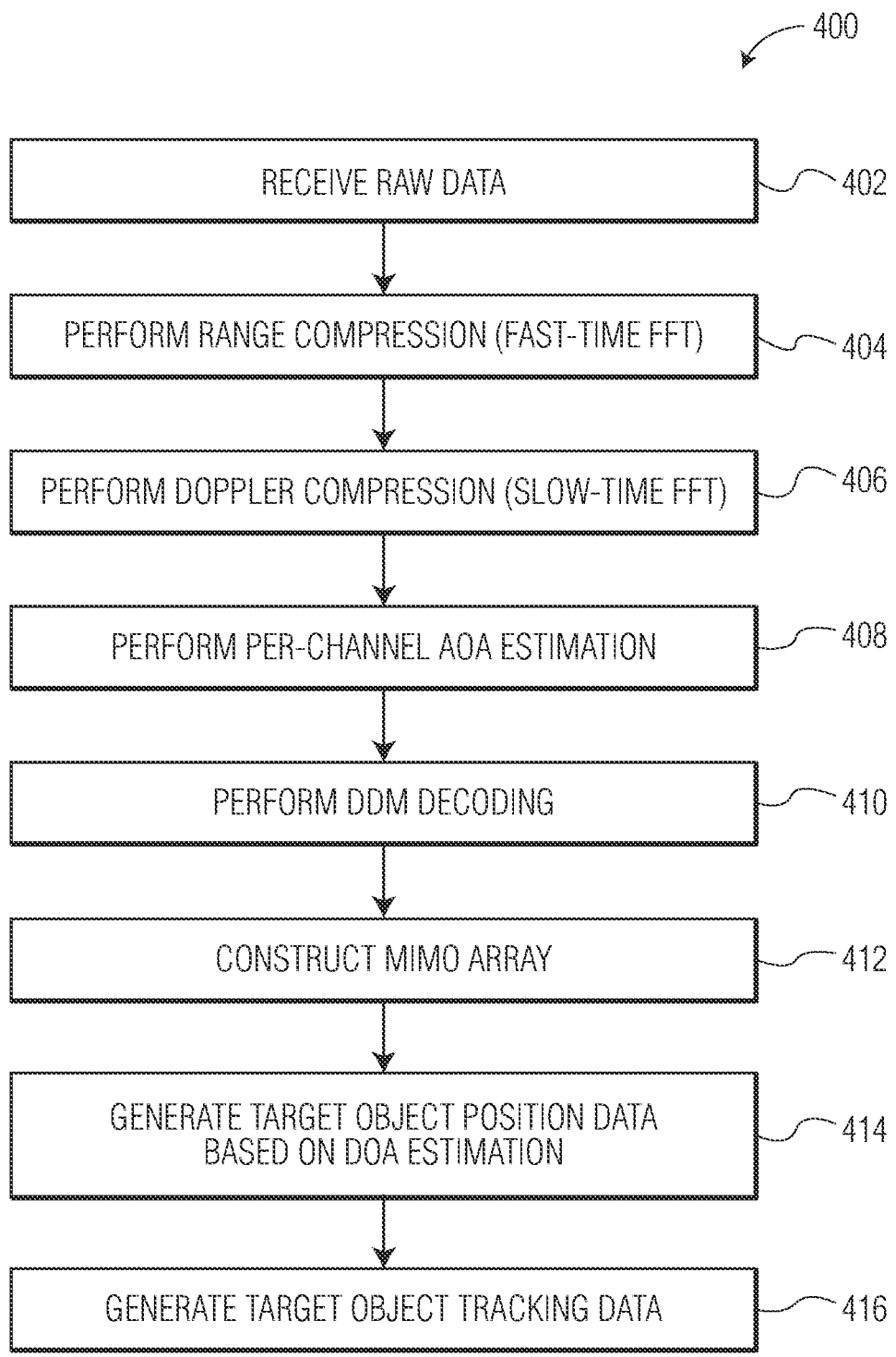
FIG. 4 is a process flow diagram describing a method of object tracking, where the method may be performed by a radar system, such as the radar system of FIG. 1, which includes performing DDM decoding following range compression and Doppler compression of raw data samples, in accordance with one or more embodiments.

FIG. 4 shows an illustrative process flow for a method 400 by which raw data corresponding to sampled return signals corresponding to reflections of transmitted signals (e.g., chirps transmitted in accordance with a DDM scheme, such as that shown in the timing diagram 200 of FIG. 2) that are reflected by target objects in an environment around a DDM-MIMO radar system. The method 400 may be performed using either or both of a radar controller and signal processor of a radar MCU, in accordance with one or more embodiments. The method 400 is described with reference to elements of the radar system 100 of FIG. 1. However, it should be understood that this is illustrative and not limiting, at least in that other suitable radar systems may be used to carry out the method 400 in one or more other embodiments.

At block 402, the signal processor 110 of the MCU 104 of the radar system 100 receives raw sample data (sometimes referred to as "ADC samples) from one or more ADCs 130 of the receiver modules 128. These ADC samples may be output by the ADCs 130 as digital signals. These ADC samples represent received signals (sometimes referred to as "reflected signals" or "return signals") corresponding to reflections of transmit signals (i.e., chirps) transmitted by the transmitter modules 118 via the transmit antenna elements 126 (e.g., in accordance with a DDM scheme, such as the DDM scheme shown in the timing diagram 200 of FIG. 2), where the transmit signals are reflected off of one or more target objects in the environment of the radar system 100. The return signals are received by the receiver modules 128 via the receive antenna elements 142.

At block 404, the signal processor 110 performs range compression of the raw ADC samples by performing a fast-time FFT or DFT on the raw ADC samples, for example. The signal processor 110 may generate a range chirp antenna cube (RCAC) as an output of this fast-time FFT or DFT.

At block 406, the signal processor 110 performs Doppler compression of the RCAC by performing a slow-time FFT or DFT on the RCAC, for example. The signal processor 110 may generate a range-Doppler antenna cube as an output of this slow-time FFT or DFT. The range-Doppler antenna cube may be a three-dimensional array having dimensions m×n×p, where m represents the number of Doppler bins, n represents the number of range bins, and p represents the number of RX channels (e.g., corresponding to the number of receive antenna elements 142 or the number of receiver modules 128) represented in the range-Doppler antenna cube. Herein, p is sometimes referred to as the "channel dimension" in the context of the range-Doppler antenna cube and range bin matrices extracted therefrom. Each element of the range-Doppler antenna cube may encode complex amplitude of a received signal for a particular range bin, Doppler bin, and RX channel. In one or more embodiments, a given RX channel slice of the range-Doppler antenna cube may be represented as a two-dimensional (2D) array of range-Doppler cells, with the complex amplitude of each cell corresponding to the average complex amplitude within a region bound, in Cartesian space, by corresponding pairs of iso-Doppler lines and iso-range lines. That is, the boundaries of each range bin are defined by a corresponding pair of iso-range lines and the boundaries of each Doppler bin are defined by a corresponding pair of iso-Doppler lines. Each range-Doppler cell corresponds to a respective Doppler bin and range bin pair.

Because the transmitter modules 118 transmit chirps simultaneously in a DDM-MIMO radar system, information from all TX channels is represented in each element in the range-Doppler antenna cube. Each range bin represents ranges or distances between the radar system and a target object. Each Doppler bin represents Doppler shift values corresponding to velocities at which a target object may be traveling (e.g., relative to the ego velocity of the radar system 100). Such velocities may be calculated based on the determined Doppler shift associated with the target object.

At block 408, the signal processor 110 performs per-channel (e.g., per-RX-channel) AoA estimation using the range-Doppler antenna cube. In one or more embodiments, the signal processor 110 performs the per-channel AoA estimation by extracting range bins from the range-Doppler antenna cube and performing a channel dimension FFT or DFT on each range-Doppler cell of the extracted range bin to generate FFT or DFT output matrices (i.e., with each FFT or DFT output matrix corresponding to a respective range bin of the range-Doppler antenna cube). Examples of such per-channel AoA estimation are provided in more detail below in connection with FIGS. 5-8.

At block 410, the signal processor 110 performs DDM decoding of the range-Doppler antenna cube based on the FFT or DFT output matrices generated by the per-channel AoA estimation performed at block 408 to generate a decoded RDBM. Examples of how the signal processor may generate a decoded RDBM are described in more detail below in connection with FIGS. 5-8, in accordance with various embodiments.

At block 412, the signal processor 110 constructs a virtual MIMO array based on the decoded RDBM and the range-Doppler antenna cube.

At block 414, the signal processor 110 generates target object position data based on AoA estimation using the virtual MIMO array.

At block 416, signal processor 110 generates target object tracking data based on the target object position data.

Figure 5:
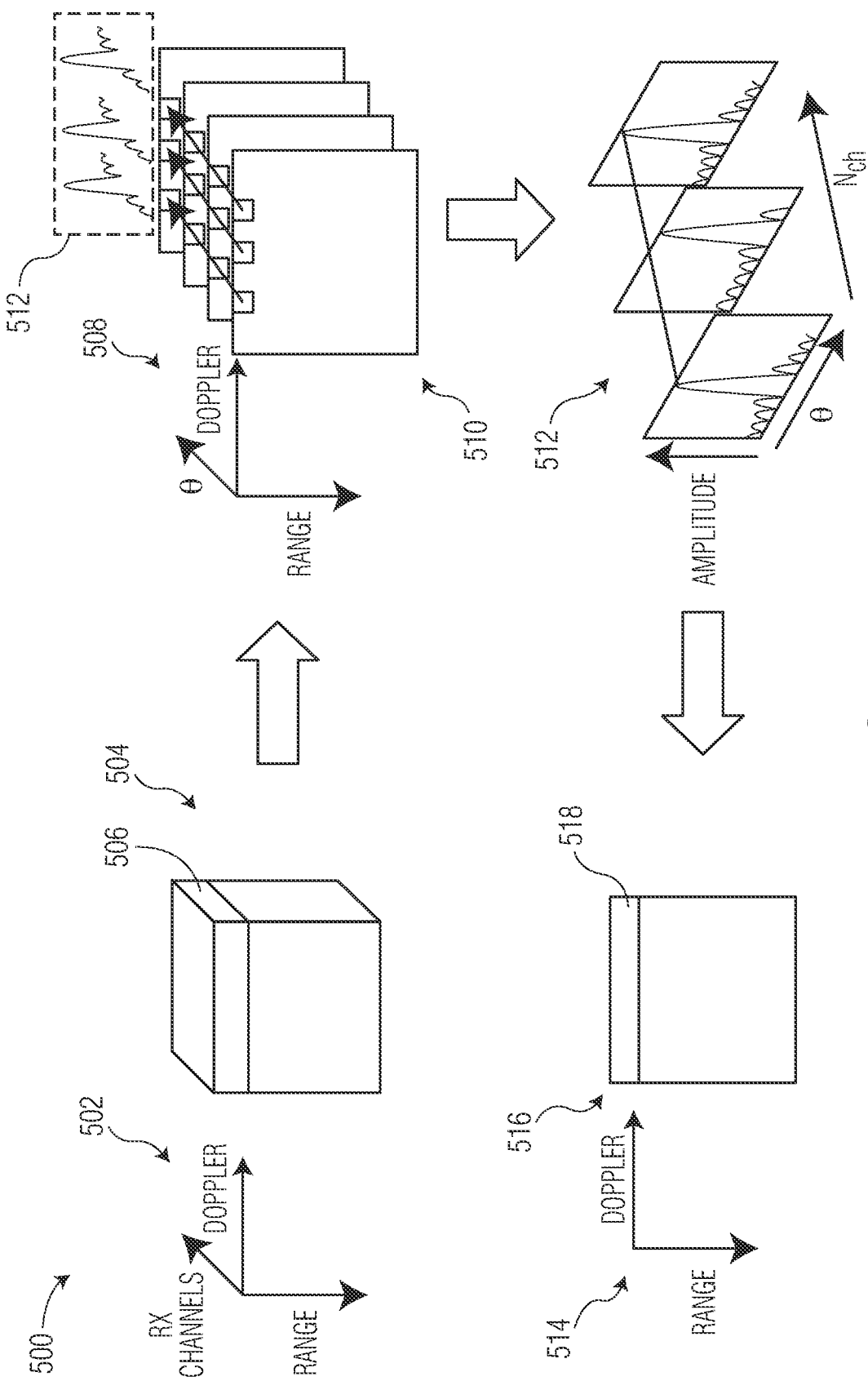
FIG. 5 is a diagram illustrating an input range-Doppler antenna cube and a decoded range-Doppler bit map (RDBM) generated based on the input range-Doppler antenna cube, in accordance with one or more embodiments.

FIG. 5 shows an example diagram 500, which illustrates the generation of a decoded RDBM 510 based on a three-dimensional (3D) range-Doppler antenna cube 504 via a DDM decoding process. For example, the signal processor of a radar system (e.g., signal processor 110 of the radar system 100 of FIG. 1) may generate a range-Doppler antenna cube 504 by performing fast-time and slow-time FFTs or DFTs on raw ADC samples of reflected signals received by the radar system (e.g., corresponding to blocks 404 and 406 of the method 400 of FIG. 4, as a non-limiting example). The range-Doppler antenna cube 504 may be a m×n×p three-dimensional array arranged in accordance with illustrated axes 502, with a first dimension (m) corresponding to Doppler bins (e.g., each defined by corresponding iso-Doppler lines), a second dimension (n) corresponding to range bins (e.g., each defined by corresponding iso-range lines), and a third dimension (p) corresponding to RX channels. The signal processor may perform a DDM decoding process on range-Doppler antenna cube 504 to generate a decoded RDBM 516. In one or more embodiments, the signal processor may process each range bin (e.g., range bin matrix 506) of the range-Doppler antenna cube individually to generate a corresponding row (e.g., row 518) of the decoded RDBM 516, which may be an m×n matrix or two-dimensional array, in accordance with the axes 514.

For example, as part of the DDM decoding process, the signal processor may perform a DFT or FFT on each range-Doppler cell of the range-Doppler antenna cube 504 in the channel dimension to obtain the output matrices 510. Each output matrix 510 may be represented as a matrix of range-Doppler cells corresponding to respective angle or arrival or angle bin, as indicated by the axes 508. In one or more other embodiments, the DFT or FFT results may instead be represented as matrices of angle-Doppler cells, each corresponding to a respectively different range bin (see, e.g., Table 2). The signal processor may identify peak locations in the angle dimension for each Doppler bin of the output matrices 510. Because transmitter data is encoded in the output matrices 510 by predetermined amounts of Doppler shift for each transmit channel (e.g., determined by the DDM code), the signal processor may compare the peak location for each Doppler bin to peak locations in other Doppler bins corresponding to the other transmit channels (e.g., $TX_2$, $TX_3$, $TX_4$) based on the DDM code. This may be accomplished by the signal processor extracting Doppler bin groups 512 from the output matrices 510.

The signal processor may then compare peak locations between each Doppler bin in the group 512 to determine how many of the peak locations of each group are aligned (e.g., how many peak locations of the group are in the same angle bin or are within a predefined distance of the same angle bin). The signal processor may determine whether the determined number of aligned peaks are greater than or equal to a predefined threshold. For each Doppler bin, if the number of aligned peaks in the corresponding group is greater than or equal to the predefined threshold, the signal processor may set the corresponding cell of the decoded RDBM to a binary value of 1 and, if not, the signal processor may instead set the corresponding cell of the decoded RDBM 516 to a binary value of 0. Each cell of the RDBM 516 having a value of 1 may, therefore, be considered to correspond to a valid peak location, while cells with values of 0 are not considered to correspond to valid peak locations.

When performing the DDM decoding process, the signal processor may extract individual range bins, such as the range bin matrix 506, from the range-Doppler antenna cube 504, and, for each extracted range bin matrix, may generate a corresponding row of the decoded RDBM 516, such as the row 518.

Figure 6:
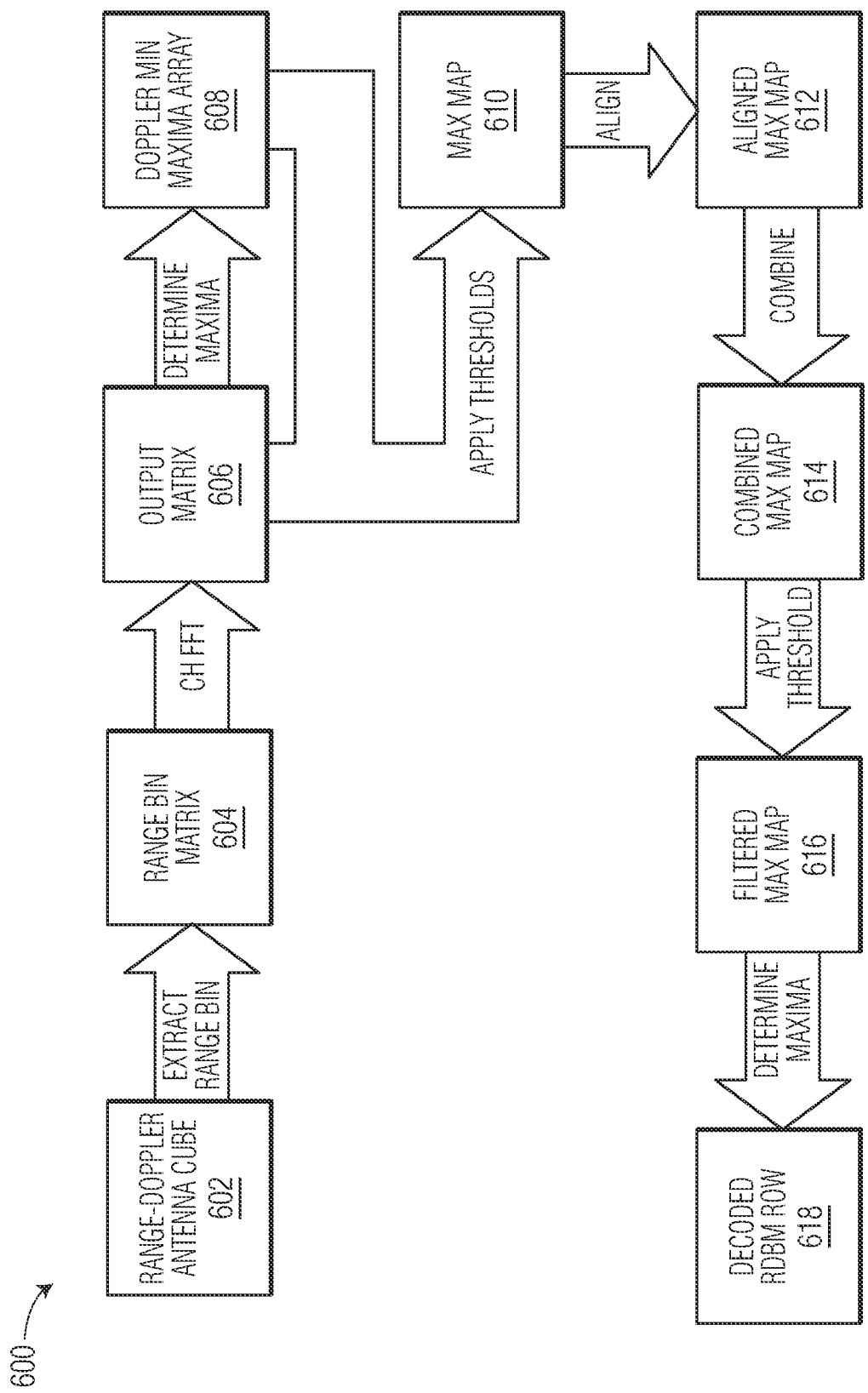
FIG. 6. is a diagram illustrating a process by which a decoded RDBM may be generated based on an input range-Doppler antenna cube, including intermediate matrices and maps and corresponding process steps, in accordance with one or more embodiments.

For example, FIG. 6 shows a diagram illustrating a process 600 by which a row of a decoded RDBM (referred to here as a "decoded RDBM row 618") is generated by a signal processor of a radar system (e.g., by the signal processor 110 of the radar system 100 of FIG. 1, as a non-limiting example) based on a range bin (referred to here as a "range bin matrix 604") extracted from a range-Doppler antenna cube 602 (e.g., an example embodiment of the range-Doppler antenna cube 504 of FIG. 5). First, the signal processor extracts a range bin matrix 604 from the range-Doppler antenna cube 604. The range-Doppler antenna cube 602 may be a three-dimensional array with dimensions m×n×p, where m represents the number of Doppler bins, n represents the number of range bins, and p represents the number of RX channels represented in the range-Doppler antenna cube. The range bin matrix 604 may be a two-dimensional matrix with dimensions m×p. For example, columns of the range bin matrix 604 represent Doppler bins and rows of the range bin matrix represent RX channels. An example of the range bin matrix 604 is shown in Table 1, below.

TABLE 1

|      | D0      | D1      | ... | D255      |
|------|---------|---------|-----|-----------|
| CH0  | D0_CH0  | D1_CH0  | ... | D255_CH0  |
| CH1  | D0_CH1  | D1_CH1  | ... | D255_CH1  |
| CH2  | D0_CH2  | D1_CH2  | ... | D255_CH2  |
| CH3  | D0_CH3  | D1_CH3  | ... | D255_CH3  |
| CH4  | D0_CH4  | D1_CH4  | ... | D255_CH4  |
| CH5  | D0_CH5  | D1_CH5  | ... | D255_CH5  |
| CH6  | D0_CH6  | D1_CH6  | ... | D255_CH6  |
| CH7  | D0_CH7  | D1_CH7  | ... | D255_CH7  |
| CH8  | D0_CH8  | D1_CH8  | ... | D255_CH8  |
| CH9  | D0_CH9  | D1_CH9  | ... | D255_CH9  |
| CH10 | D0_CH10 | D1_CH10 | ... | D255_CH10 |
| CH11 | D0_CH11 | D1_CH11 | ... | D255_CH11 |
| CH12 | D0_CH12 | D1_CH12 | ... | D255_CH12 |
| CH13 | D0_CH13 | D1_CH13 | ... | D255_CH13 |
| CH14 | D0_CH14 | D1_CH14 | ... | D255_CH14 |
| CH15 | D0_CH15 | D1_CH15 | ... | D255_CH15 |

In the example of Table 1, the range bin matrix 604 includes 256 columns, each representing a respective Doppler bin. Each Doppler bin corresponds to a transmitted chirp. That is, if 256 chirps are transmitted via each TX channel of the radar system, the corresponding range bin matrix will include 256 Doppler bins. The range bin matrix 604 includes 16 rows, each representing a respective RX channel.

The signal processor then performs a channel dimension FFT on each range-Doppler cell of the range bin matrix 604 to generate an FFT output matrix 606. In one or more embodiments, the type of FFT that the signal processor performs on the range bin matrix 604 may depend on the number of RX channels represented in the range-Doppler antenna cube 602. For example, given a radar system with 16 RX channels represented in the range-Doppler antenna cube 602, the signal processor may perform a 16-point FFT on each range bin of the range-Doppler antenna cube 602, including the range bin matrix 604. The FFT of the range bin matrix 604 generates an FFT output matrix 606 with dimensions m×p. Columns of the FFT output matrix 606 represent Doppler bins; rows of the FFT output matrix 606 represent angle bins, with each angle bin corresponding of to a range of angles of arrival; and each cell of the FFT output matrix 606 represents an FFT result associated with a corresponding cell of the range bin matrix 604. In one or more other embodiments, rows of the FFT output matrix 606 represent discrete angles of arrival, rather than angle bins. It should be understood that the process 600 is not limited to using FFTs, such that, in one or more other embodiments, process 600 may instead use other suitable DFT techniques. An example of the FFT output matrix 606 is shown in Table 2, below.

TABLE 2

|     | D0       | D1       | ... | D255       |
|-----|----------|----------|-----|------------|
| θ0  | D0_FFT0  | D1_FFT0  | ... | D255_FFT0  |
| θ1  | D0_FFT1  | D1_FFT1  | ... | D255_FFT1  |
| θ2  | D0_FFT2  | D1_FFT2  | ... | D255_FFT2  |
| θ3  | D0_FFT3  | D1_FFT3  | ... | D255_FFT3  |
| θ4  | D0_FFT4  | D1_FFT4  | ... | D255_FFT4  |
| θ5  | D0_FFT5  | D1_FFT5  | ... | D255_FFT5  |
| θ6  | D0_FFT6  | D1_FFT6  | ... | D255_FFT6  |
| θ7  | D0_FFT7  | D1_FFT7  | ... | D255_FFT7  |
| θ8  | D0_FFT8  | D1_FFT8  | ... | D255_FFT8  |
| θ9  | D0_FFT9  | D1_FFT9  | ... | D255_FFT9  |
| θ10 | D0_FFT10 | D1_FFT10 | ... | D255_FFT10 |
| θ11 | D0_FFT11 | D1_FFT11 | ... | D255_FFT11 |
| θ12 | D0_FFT12 | D1_FFT12 | ... | D255_FFT12 |
| θ13 | D0_FFT13 | D1_FFT13 | ... | D255_FFT13 |
| θ14 | D0_FFT14 | D1_FFT14 | ... | D255_FFT14 |
| θ15 | D0_FFT15 | D1_FFT15 | ... | D255_FFT15 |

The signal processor then determines the maxima of each Doppler bin (e.g., each column) of the FFT output matrix 606 and generates a Doppler bin maxima array 608 that includes the determined maxima. For example, the Doppler bin maxima array 608 may be a one-dimensional array of length m, where each cell of the Doppler bin maxima array 608 represents a respective maximum value of a corresponding column (e.g., Doppler bin) of the FFT output matrix 606. An example of the Doppler bin maxima array 608 is represented in Table 3, below.

TABLE 3

|     | D0     | D1     | ... | D255     |
|-----|--------|--------|-----|----------|
| MAX | D0_MAX | D1_MAX | ... | D255_MAX |

The signal processor then applies per-column thresholds to the FFT output matrix 606 to generate a MAX map 610. It should be understood that any "map" referred to herein may be represented as a matrix or two-dimensional array. Here, a "MAX" map refers to a max of maximum values, which may be a sparse map in which cells corresponding to locations of per-column maximum values have a predetermined, non-zero value, VAL, and all other cells of the MAX map have a value of 0. The signal processor 110 may combine the decoded RDBM rows to generate the decoded RDBM. In one or more embodiments, the signal processor sets any cell of the FFT output matrix 606 having a value that is greater than or equal to the threshold for the corresponding column to the predetermined, non-zero value, VAL, and sets all other cells (i.e., those with values less than their corresponding thresholds) to zero. For example, to generate the MAX map 610, the threshold for a given column (e.g., Doppler bin) is set as the corresponding value of the Doppler bin maxima array 608. An example of the MAX map 610 is shown in Table 4, below:

TABLE 4

|     | D0 | D1  | ... | D255 |
|-----|----|-----|-----|------|
| θ0  | 0  | 0   | ... | 0    |
| θ1  | 0  | 0   | ... | 0    |
| θ2  | 0  | 0   | ... | 0    |
| θ3  | 0  | 0   | ... | 0    |
| θ4  | 0  | VAL | ... | 0    |
| θ5  | 0  | 0   | ... | 0    |
| θ6  | 0  | 0   | ... | 0    |
| θ7  | 0  | 0   | ... | 0    |
| θ8  | 0  | 0   | ... | 0    |

TABLE 4-continued

|   | D0  | D1 | ... | D255 |
|---|-----|----|-----|------|
| θ9  | 0   | 0  | ... | 0    |
| θ10 | VAL | 0  | ... | 0    |
| θ11 | 0   | 0  | ... | 0    |
| θ12 | 0   | 0  | ... | 0    |
| θ13 | 0   | 0  | ... | 0    |
| θ14 | 0   | 0  | ... | VAL  |
| θ15 | 0   | 0  | ... | 0    |

In the example of Table 4, cells of the FFT output matrix 606 having values equal to or greater than corresponding maxima of the Doppler bin maxima array 608 are replaced with the predetermined value VAL, and all other cells are replaced with zeroes. For example, cells D0_FFT10, D1_FFT4, and D255_FFT14 have values equal to or greater than the corresponding maxima of the Doppler bin maxima array 608, and so are replaced with VAL. In this way, the non-zero cells in the MAX map 610 indicate the angle bin or angle of arrival corresponding to a detected peak (e.g., peak signal magnitude) for each Doppler bin.

The signal processor then generates an aligned MAX map 612 based on the MAX map 610, where the aligned MAX map 612 includes groups of columns of the MAX map 610. The columns of each group correspond to a respective unambiguous velocity, accounting for Doppler domain offsets of the TX channels represented in that group. Each group includes a respective column for each TX channel, such that the number of columns in a given group of the aligned MAX map 612 corresponds to the number of TX channels.

For example, in a DDM-MIMO radar system, the range-Doppler antenna cube 602 (and also, therefore, the range bin matrix 604, the FFT output matrix 606, and the MAX map 610) includes respective sets of TX channel data for all TX channels of the radar system, where each set of TX channel data is offset (with respect to the Doppler bin dimension) from and overlaid with the sets of TX channel data of the other TX channels. Here, a set of "TX channel data" for a given TX channel (e.g., $TX_1$, $TX_2$, $TX_3$, or $TX_4$) refers to data (e.g., ADC samples or data derived from such samples) representing return signals corresponding to reflections of chirps transmitted via that TX channel. For example, in the MAX map 610, $TX_1$ channel data may have an offset of 0 Doppler bins, $TX_2$ channel data may have an offset of 50 Doppler bins, $TX_3$ channel data may have an offset of 120 Doppler bins, and $TX_3$ channel data may have an offset of 204 Doppler bins, although it should be understood that other combinations of Doppler bin offsets could instead be used. Thus, for Doppler bin 0 of the MAX map 610 and given the Doppler bin offsets described above, the $TX_1$ channel data associated with Doppler bin D0 is the D0 column of the MAX map 610, the $TX_2$ channel data associated with Doppler bin D0 is the D49 column of the MAX map 610, the $TX_3$ channel data associated with Doppler bin D0 is the D119 column of the MAX map 610, and the $TX_3$ channel data associated with Doppler bin D0 is the D229 column of the MAX map 610. The aligned MAX map 612, therefore, is a two-dimensional matrix with dimensions $(m*N_{ch}) \times p$, where $N_{ch}$ is the number of TX channels of the radar system. So, given a radar system with 4 TX channels, m=256 Doppler bins, and p=16 RX channels, the aligned MAX map 612 has 1024 columns and 16 rows. An example of the aligned MAX map 612 is shown in Table 5, below.

TABLE 5

|     | D0_TX1 | D0_TX2 | D0_TX3 | D0_TX4 | D1_TX1 | D1_TX2 | D1_TX3 | D1_TX4 | ... | D255_TX4 |
|-----|--------|--------|--------|--------|--------|--------|--------|--------|-----|----------|
| θ0  | 0      | 0      | 0      | 0      | 0      | 0      | 0      | 0      | ... | 0        |
| θ1  | 0      | 0      | 0      | 0      | 0      | 0      | 0      | 0      | ... | 0        |
| θ2  | 0      | 0      | 0      | 0      | 0      | 0      | 0      | 0      | ... | 0        |
| θ3  | 0      | 0      | 0      | 0      | 0      | VAL    | 0      | 0      | ... | 0        |
| θ4  | 0      | 0      | 0      | 0      | VAL    | 0      | VAL    | 0      | ... | VAL      |
| θ5  | 0      | 0      | 0      | 0      | 0      | 0      | 0      | 0      | ... | 0        |
| θ6  | 0      | 0      | 0      | 0      | 0      | 0      | 0      | 0      | ... | 0        |
| θ7  | 0      | 0      | 0      | 0      | 0      | 0      | 0      | 0      | ... | 0        |
| θ8  | 0      | 0      | 0      | 0      | 0      | 0      | 0      | 0      | ... | 0        |
| θ9  | 0      | 0      | 0      | 0      | 0      | 0      | 0      | 0      | ... | 0        |
| θ10 | VAL    | VAL    | VAL    | VAL    | 0      | 0      | 0      | 0      | ... | 0        |
| θ11 | 0      | 0      | 0      | 0      | 0      | 0      | 0      | 0      | ... | 0        |
| θ12 | 0      | 0      | 0      | 0      | 0      | 0      | 0      | 0      | ... | 0        |
| θ13 | 0      | 0      | 0      | 0      | 0      | 0      | 0      | VAL    | ... | 0        |
| θ14 | 0      | 0      | 0      | 0      | 0      | 0      | 0      | 0      | ... | 0        |
| θ15 | 0      | 0      | 0      | 0      | 0      | 0      | 0      | 0      | ... | 0        |

In the example of Table 5, the aligned MAX map 612 includes multiple groups of columns extracted from the MAX map 610. Each group includes one column for each of the transmit channels $TX_1$, $TX_2$, $TX_3$, and $TX_4$. Each column in a given group is extracted from the MAX map 610 by the signal processor based on a Doppler bin associated with that group and a Doppler offset (sometimes referred to as "spacings") associated with the TX channel represented by that column.

For example, a first group includes columns D0_TX1, D0_TX2, D0_TX3, D0_TX4 and a second group includes columns D1_TX1, D1_TX2, D1_TX3, D1_TX4. For the first group of columns D0_TX1, D0_TX2, D0_TX3, and D0_TX4, the given spacings relative to channel TX1 are 0 Doppler bins for channel TX1, 50 Doppler bins for channel TX2, 120 Doppler bins for channel TX3, and 230 Doppler bins for channel TX4. D0_TX1 corresponds to column D0 of the MAX map 610, D0_TX2 corresponds to column D50 of the MAX map 610, D0_TX2 corresponds to column D120 of the MAX map 610, and D0_TX3 corresponds to column D230 of the MAX map 610. The spacings associated with each TX channel do not change between groups, such that, for the second group, D1_TX1 corresponds to column D1 of the MAX map 610, D1_TX2 corresponds to column D51 of the MAX map 610, D1_TX2 corresponds to column D121 of the MAX map 610, D1_TX3 corresponds to column D230 of the MAX map 610. When determining the column of the MAX map 610 corresponding to a given column of the aligned MAX map 612, indices exceeding 255 wrap around. For example, the 230th group of the aligned MAX map 612 includes D230_TX1, D230_TX2, D230_TX3, and D230_TX4. D230_TX1 corresponds to column D230 of the MAX map 610. D230_TX2 corresponds to column D24 of the MAX map 610 (i.e., since (230+50) % 256=24). D230_TX3 corresponds to column D94 of the MAX map 610 (i.e., since (230+120) % 256=94). D230_TX4 corresponds to column D204 of the MAX map 610 (i.e., since (230+230) % 256=204).

As shown in the example of Table 5, the values VAL of the first group are all aligned in the same row corresponding to angle bin θ10, while only two of the values VAL of the second group are disposed in the same angle bin. This indicates that the maxima of the first group are more likely to respond to a valid peak than those of the second group, as assessed by the signal processor in a subsequent thresholding step.

The signal processor generates a combined MAX map 614 based on the aligned MAX map 612 by taking a scalar product of the rows in each group of the aligned MAX map 612, effectively combining each group into a single corresponding column of the combined MAX map 614. For example, the length of the scalar product may be the same as the number of TX channels, given as $N_{ch}$, and the coefficients used are each ($1/N_{ch}$). Given a system with 4 TX channels, the length of the scalar product would be 4 and the coefficients would each be ¼. For each row of each group of the aligned MAX map 612, the result of the scalar product operation for that row is equal to the sum of the cells of that row divided by 4. An example of the combined MAX map 614 is shown in Table 6, below.

TABLE 6

|  | D0 | D1 | ... | D255 |
|---|---|---|---|---|
| θ0 | 0 | 0 | ... | 0 |
| θ1 | 0 | 0 | ... | 0 |
| θ2 | 0 | 0 | ... | 0 |
| θ3 | 0 | VAL/4 | ... | 0 |
| θ4 | 0 | VAL/2 | ... | VAL/4 |
| θ5 | 0 | 0 | ... | VAL/2 |
| θ6 | 0 | 0 | ... | 0 |
| θ7 | 0 | 0 | ... | 0 |
| θ8 | 0 | 0 | ... | 0 |
| θ9 | 0 | 0 | ... | 0 |
| θ10 | VAL | 0 | ... | 0 |
| θ11 | 0 | 0 | ... | 0 |
| θ12 | 0 | 0 | ... | 0 |
| θ13 | 0 | VAL/4 | ... | 0 |
| θ14 | 0 | 0 | ... | VAL/4 |
| θ15 | 0 | 0 | ... | 0 |

As shown in the example of Table 6, the value of the cell at D0 and CH10 is equal to VAL because all of the maximum values for in the first group (corresponding to D0) in Table 5 are aligned in angle bin θ10. In contrast, the columns D0 and D255 include fractional values VAL/2 and VAL/4 across multiple angle bins because the corresponding groups of the aligned MAX map 612 in Table 5 contained maximum values in those angle bins.

In one or more embodiments, only those values VAL of a given group of the aligned MAX map that are in the same angle bin are considered to be "aligned" in that angle bin (i.e., they are considered to have the same or similar angles of arrival). In one or more other embodiments, peak relaxation may be applied by the signal processor by adjusting the tolerance that defines whether two values VAL in a given row (i.e., angle bin) of a group are considered to be "aligned". For example, a peak relaxation condition employed by the signal processor may define two values VAL in a group as being aligned if they are in adjacent angle bins or within a predefined range of angle bins with respect to one another. For example, when employing such a peak relaxation condition, the signal processor may define each of the values VAL in rows $D1\_TX_1$, $D1\_TX_2$, $D1\_TX_3$ of aligned MAX map represented in Table 5 as being aligned because they are in adjacent angle bins (e.g., angle bins θ3 and θ4).

After generating the aligned MAX map, the signal processor 110 applies a threshold to the combined MAX map 614 to identify cells corresponding to valid peaks. For example, a cell of the combined MAX map 614 may correspond to a valid peak if its value exceeds a decoding threshold, K. The signal processor may compare the value of each cell of the combined MAX map 614 to a threshold of $(K*VAL)/N_{ch}$, and cell values greater than or equal to the threshold return a value of 1 in the filtered MAX map 616, while other cell values that are less than the threshold return a value of 0. In one or more embodiments, where $N_{ch}$=4, a decoding threshold of K=4 may be used, which, in the present example, requires maxima in all 4 TX channels to be aligned in the same angle bin, such that only cell values of the combined MAX map 614 with values of VAL are considered valid. In one or more other embodiments, a decoding threshold of K=3 may be used, which, in the present example, requires maxima in 75% of the TX channels to be aligned in the same angle bin, such that cell values of the combined MAX map 614 with values of 3VAL/4 are considered valid. An example of the filtered MAX map 616 is shown in Table 7, below.

TABLE 7

|  | D0 | D1 | ... | D255 |
|---|---|---|---|---|
| θ0 | 0 | 0 | ... | 0 |
| θ1 | 0 | 0 | ... | 0 |
| θ2 | 0 | 0 | ... | 0 |
| θ3 | 0 | 0 | ... | 0 |
| θ4 | 0 | 0 | ... | 0 |
| θ5 | 0 | 0 | ... | 0 |
| θ6 | 0 | 0 | ... | 0 |
| θ7 | 0 | 0 | ... | 0 |
| θ8 | 0 | 0 | ... | 0 |
| θ9 | 0 | 0 | ... | 0 |
| θ10 | 1 | 0 | ... | 0 |
| θ11 | 0 | 0 | ... | 0 |
| θ12 | 0 | 0 | ... | 0 |
| θ13 | 0 | 0 | ... | 0 |
| θ14 | 0 | 0 | ... | 0 |
| θ15 | 0 | 0 | ... | 0 |

In the example of Table 7, a decoding threshold of K=4 is used, and the cell at column D0 and row CH10 has a value of 1, while all other cells in the column D0 have a value of 0. The cells of the column D1 are all 0 because the signal processer determined Doppler bin D1 did not contain a valid peak.

The signal processor then generates a decoded RDBM row 618 based on the filtered MAX map 616 by determining the maximum value of each column (i.e., each Doppler bin) of the filtered MAX map 616. An example of the decoded RDBM row 618 is shown in Table 8, below.

TABLE 8

|     | D0 | D1 | ... | D255 |
| --- | --- | --- | --- | --- |
| MAX | 1 | 0 | ... | 0 |

Figure 10:
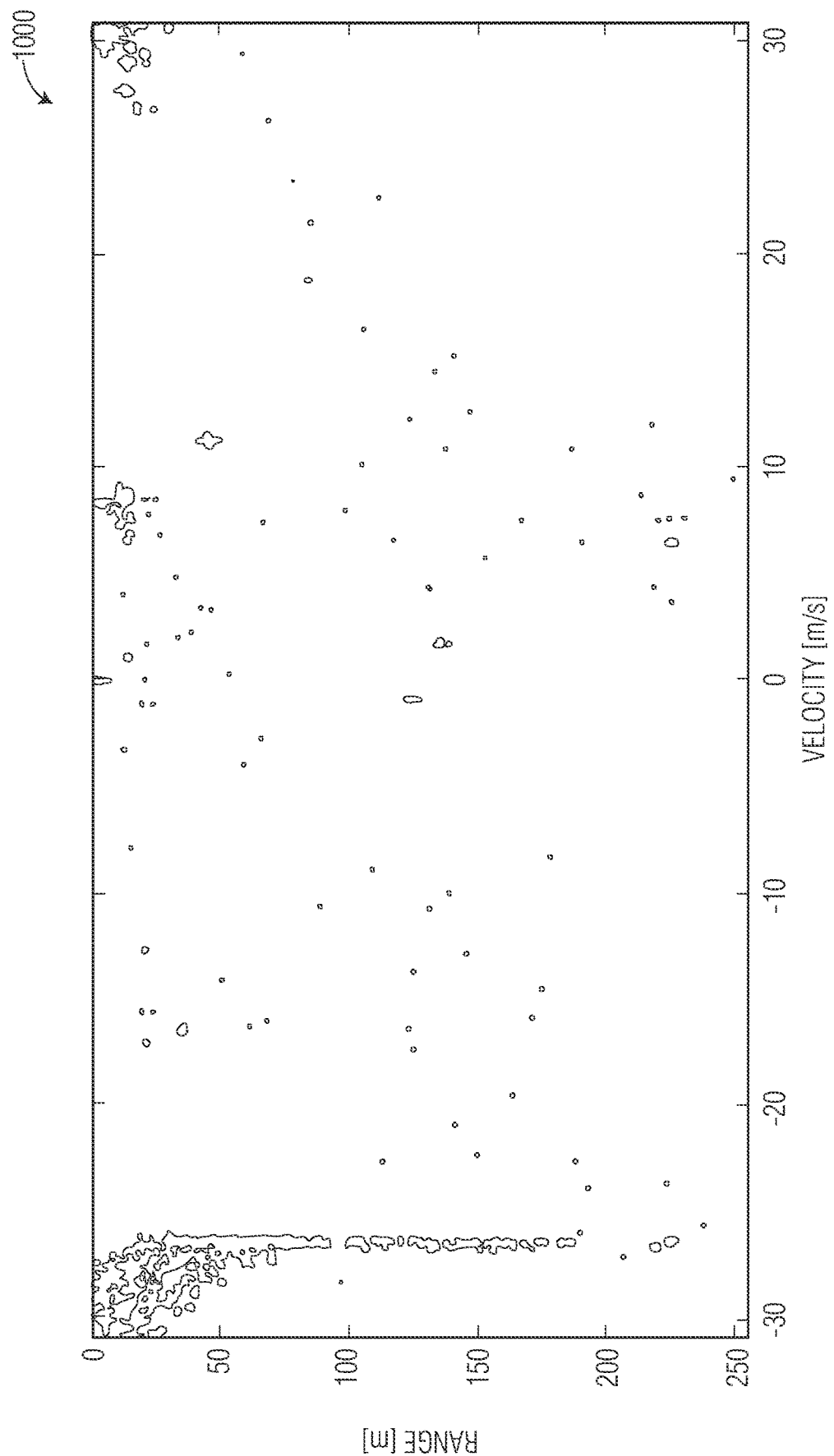
FIG. 10 is a chart illustrating a decoded RDBM corresponding to the coherently integrated RDM of FIG. 9 and generated in accordance with a decoding method, such as the method of FIG. 7 or the method of FIG. 8, in accordance with one or more embodiments.

The signal processor may repeat the process 600 for each range bin of the range-Doppler antenna cube 602, and the resultant decoded RDBM rows 618 may be combined to form a decoded RDBM (e.g., the decoded RDBM 1000 of FIG. 10).

Figure 7:
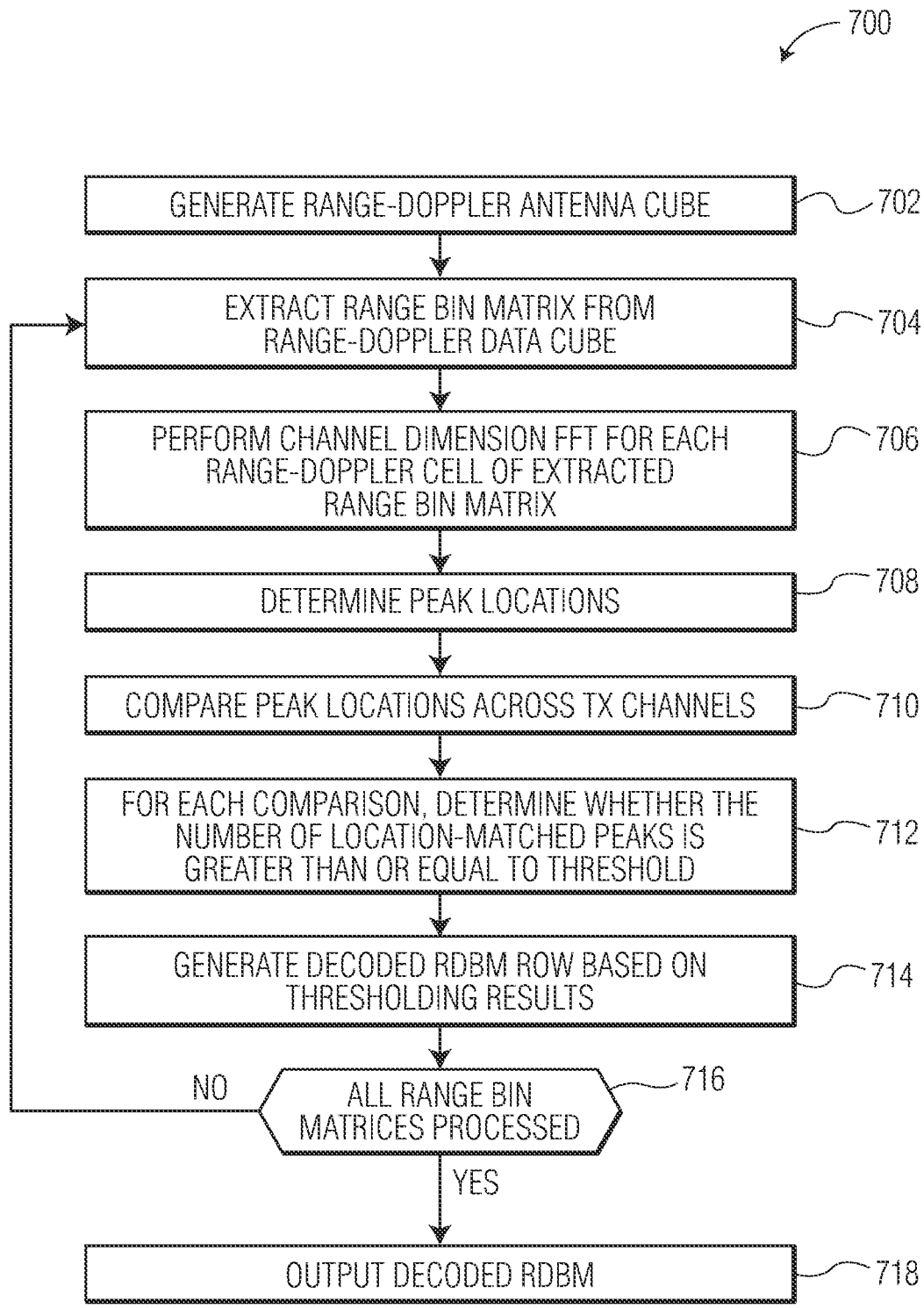
FIG. 7 is a process flow diagram describing a method of generating a decoded RDBM, where the method may be performed by a radar system, such as the radar system of FIG. 1, and may be performed as part of a method object tracking, such as the method of FIG. 4, in accordance with one or more embodiments.

FIG. 7 shows an illustrative process flow for a method 700 by which a decoded RDBM may be generated from a 3D range-Doppler antenna cube representing properties of sampled return signals corresponding to reflections of transmitted signals (e.g., chirps transmitted in accordance with a DDM scheme, such as the DDM scheme shown in the timing diagram 200 of FIG. 2) that are reflected by target objects in an environment around a DDM-MIMO radar system. The method 700 may be performed using either or both of a radar controller and signal processor of a radar MCU, in accordance with one or more embodiments. The method 700 is described with reference to elements of the radar system 100 of FIG. 1, though it should be understood that this is illustrative and not limiting, at least in that other suitable radar systems may be used to carry out the method 700 in one or more other embodiments.

At block 702, the signal processor 110 of the radar system 100 generates a range-Doppler antenna cube. For example, the signal processor 110 of the radar system 100 may generate the range-Doppler antenna cube by performing fast-time FFT and a slow-time FFT on raw ADC data (e.g., digital signals) representing return signals corresponding to reflected chirps that were transmitted by transmitter modules 118 of the radar system 100 in accordance with a DDM scheme, such as the DDM scheme shown in the timing diagram 200 of FIG. 2. In one or more other embodiments, the signal processor 110 may instead use other suitable DFT techniques for range and Doppler compression, instead of fast-time and slow-time FFTs.

Blocks 704 and 706 may correspond to the block 408 of the method 400 of FIG. 4, as a non-limiting example. At block 704, the signal processor 110 generates a range bin matrix from the range-Doppler antenna cube.

At block 706, the signal processor 110 performs a channel dimension FFT on each range-Doppler cell of the extracted range bin matrix to generate an output matrix. In one or more embodiments, the channel dimension FFT may be an N-point FFT (e.g., based on the number N of RX channels represented in the range-Doppler antenna cube). The output matrix may include columns representing respective Doppler bins and rows representing respective angles of arrival or angle bins.

Blocks 708-718 may correspond to the block 410 of the method 400 of FIG. 4, as a non-limiting example. At block 708, the signal processor 110 determines peak locations in the output matrix. For example, the signal processor may determine the peak locations by determining the angle bin containing the highest amplitude in each column (i.e., Doppler bin) of the output matrix.

At block 710, the signal processor 110, for each Doppler bin of the output matrix, compares the peak location of that Doppler bin to peak locations of Doppler bins corresponding to other TX channels. For example, and for a given Doppler bin (assumed here to represent the first TX channel, $TX_1$), the signal processor 110 may identify other Doppler bins of the output matrix that represent other TX channels based on the amount of offset (in the Doppler domain) applied to each set of TX channel data in accordance with the corresponding DDM code. Each set of TX channel data for each TX channel may be offset by a respectively different, predetermined amount. Returning to the example in which the offsets are 0 bins for $TX_1$, 50 bins for $TX_2$, 120 bins for $TX_3$, and 230 bins for $TX_4$ and when performing this comparison for the Doppler bin D0, the signal processor 110 compares the peak locations for Doppler bins D0, D49, D119, and D229. The signal processor 110 may determine the number of aligned peak locations associated with each Doppler bin (across all TX channels) by performing this comparison. In one or more embodiments, the signal processor 110 may be configured to determine that two peaks are "aligned" if they are located in the same angle bin. In one or more other embodiments, the signal processor 110 may be configured to determine that two peaks are "aligned" if they are within a certain range of angle bins from one another (e.g., within a distance of 1 angle bin, 2 angle bins, 3 angle bins, etc.).

At block 712, the signal processor 110 determines whether the number of aligned peak locations (sometimes referred to herein as the "location-matched peaks") is greater than or equal to a threshold in order to determine which peaks are "valid". In one or more embodiments, the threshold may be equal to the number of TX channels of the radar system 100 (e.g., effectively requiring peaks to be aligned across all TX channels in order to be considered valid peaks), which may reduce the probability of false alarm. In one or more other embodiments, the threshold may be less than the number of TX channels of the radar system 100, which may reduce the probability of missed peak detection. For example, the threshold used by the signal processor to identify valid peaks may be selected based on a desired balance between probability of false alarm and probability of missed peaks, which may be application dependent.

At block 714, the signal processor 110 generates a decoded RDBM row based on the results of applying the threshold at block 712. For example and for each cell of the decoded RDBM row, the signal processor 110 may set the value of that cell to a binary 1 if it is determined to correspond to a Doppler cell of the corresponding output matrix having a number of location-matched peaks greater than or equal to the threshold. The signal processor 110, for each cell of the decoded RDBM row, may set the value for that cell to a binary 0 in response to determining that the cell corresponds to a Doppler cell of the corresponding output matrix having a number of location-matched peaks less than the threshold.

At block 716, in response to determining that all range bin matrices of the range-Doppler antenna cube have been processed, the method 800 proceeds to block 718. Otherwise, in response to determining that unprocessed range bin matrices remain, the method 700 returns to block 704, and the signal processor 110 extracts the next unprocessed range bin matrix of the range-Doppler antenna cube.

At block 718, the signal processor 110 outputs a decoded RDBM. For example, the signal processor 110 may generate the decoded RDBM by combining the decoded RDBM rows generated at block 714 for each range bin matrix of the range-Doppler antenna cube.

Figure 8:
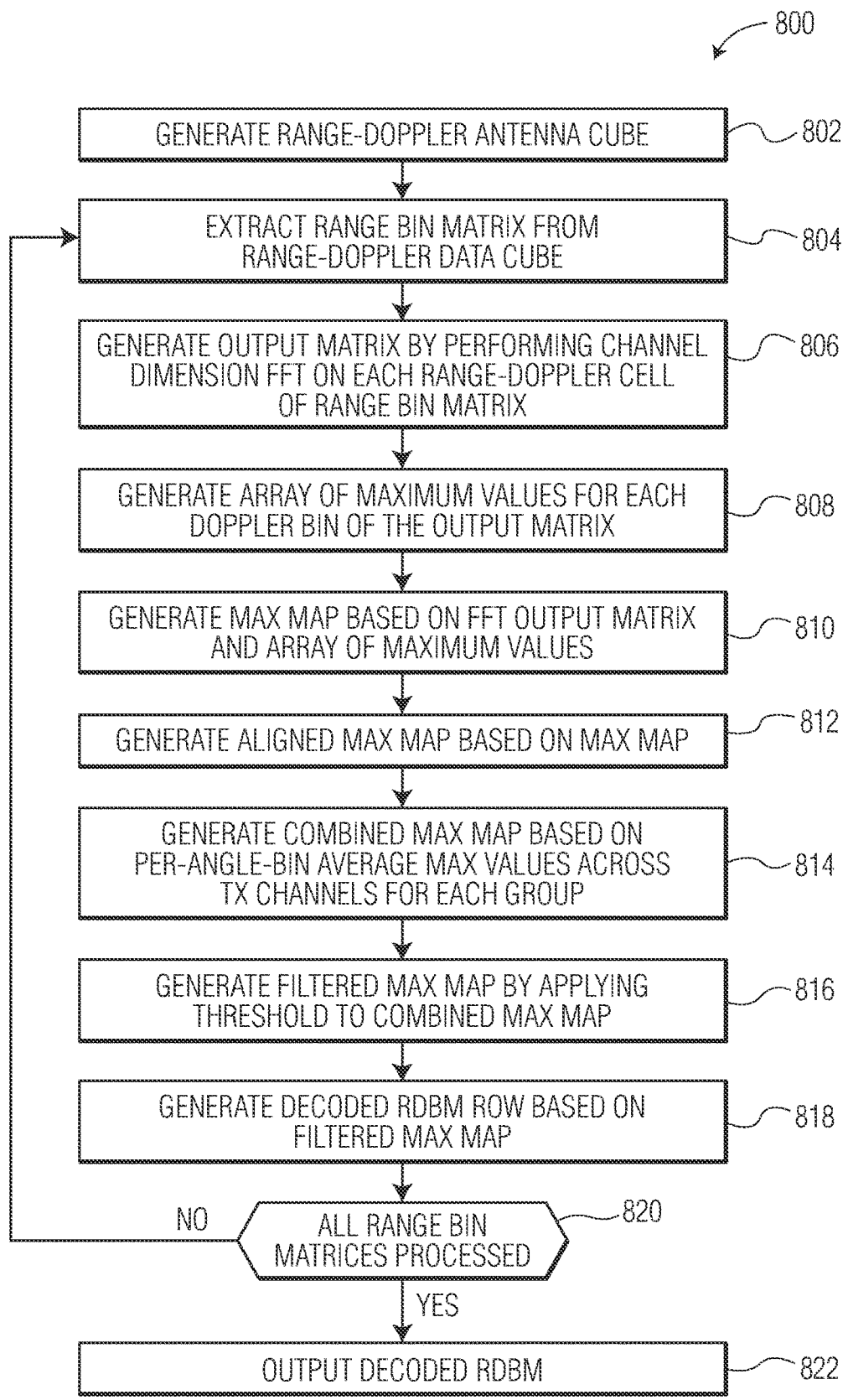
FIG. 8 is a process flow diagram describing a method of generating a decoded RDBM based on, for each range bin, locations of maximum values in a MAX map generated based on an output of a Discrete Fourier Transform (DFT) or Fast Fourier Transform (FFT), where the method may be performed by a radar system, such as the radar system of FIG. 1, and may be performed as part of a method object tracking, such as the method of FIG. 4, in accordance with one or more embodiments.

FIG. 8 shows an illustrative process flow for a method 800 by which a decoded RDBM may be generated from a 3D range-Doppler antenna cube representing properties of sampled return signals corresponding to reflections of transmitted signals (e.g., chirps transmitted in accordance with a DDM scheme, such as that shown in the timing diagram 200 of FIG. 2) that are reflected by target objects in an environment around a DDM-MIMO radar system. The method 800 may correspond to an example embodiment of the method 700 of FIG. 7. The method 800 may be performed using either or both of a radar controller and signal processor of a radar MCU, in accordance with one or more embodiments. The method 800 is described with reference to elements of the radar system 100 of FIG. 1 and the process 600 of FIG. 6, though it should be understood that this is illustrative and not limiting, at least in that other suitable radar systems may be used to carry out the method 800 in one or more other embodiments.

At block 802, the signal processor 110 of the radar system 100 generates a range-Doppler antenna cube 602. For example, the signal processor 110 of the radar system 100 may generate the range Doppler antenna cube 602 by performing fast-time FFT and a slow-time FFT on raw ADC data (e.g., digital signals) representing return signals corresponding to reflected chirps that were transmitted by transmitter modules 118 of the radar system 100 in accordance with a DDM scheme, such as the DDM scheme shown in the timing diagram 200 of FIG. 2.

Blocks 804 and 806 may correspond to the block 408 of the method 400 of FIG. 4, as a non-limiting example. At block 804, the signal processor 110 generates a range bin matrix, such as the range bin matrix 604, from the range-Doppler antenna cube 602.

At block 806, the signal processor 110 performs a channel dimension FFT on each range-Doppler cell of the extracted range bin matrix to generate an FFT output matrix, such as the FFT output matrix 606. In one or more embodiments, the channel dimension FFT may be a 16-point FFT (e.g., based on the number of RX channels represented in the range-Doppler antenna cube 602).

Blocks 808-822 may correspond to the block 410 of the method 400 of FIG. 4, as a non-limiting example. At block 808, the signal processor 110 generates a Doppler bin maxima array, such as the Doppler bin maxima array 608, representing per-column maxima detected in the FFT output matrix.

Figure 9:
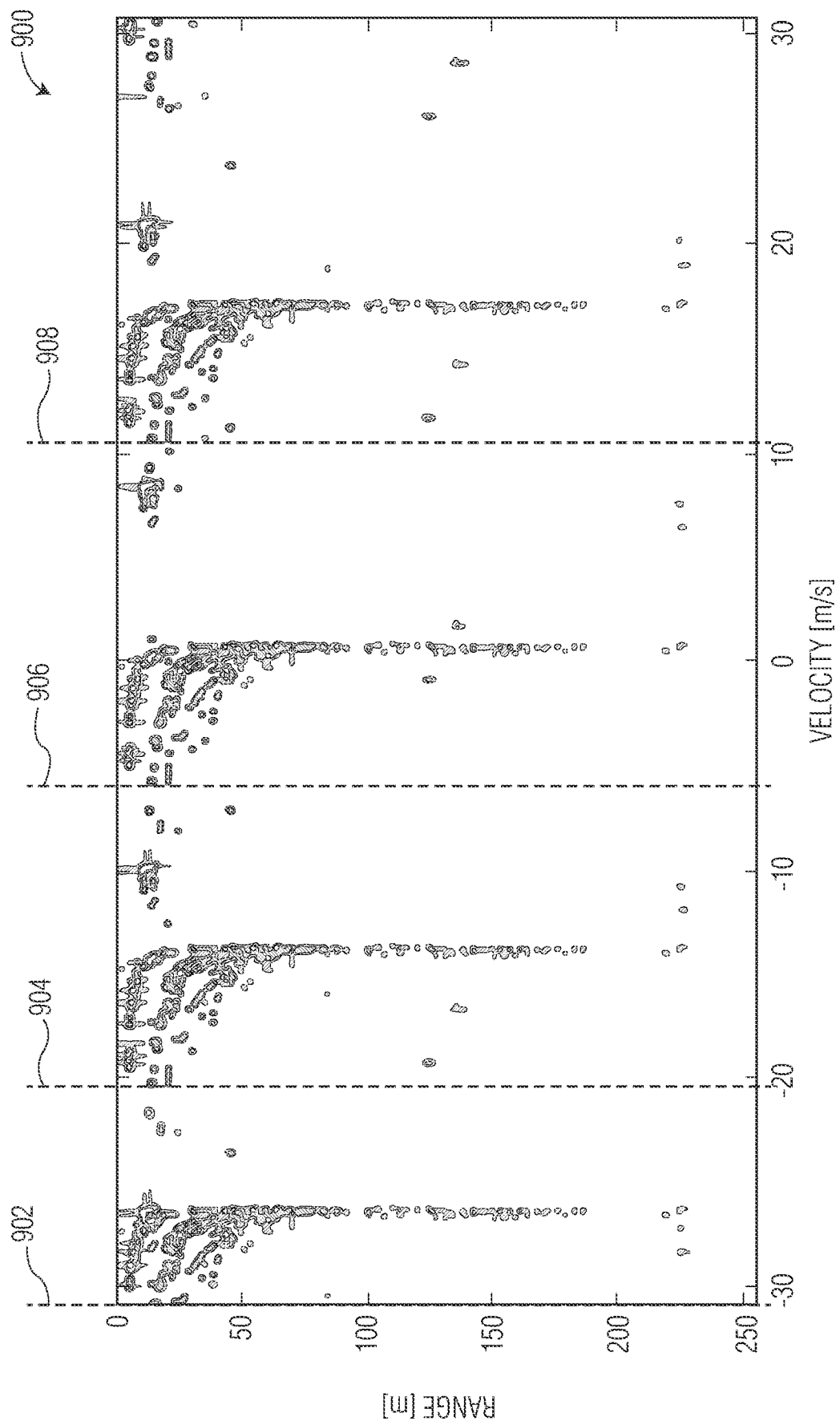
FIG. 9 is a chart illustrating a coherently integrated range-Doppler map (RDM) corresponding to reflections of chirps transmitted concurrently according to a linear chirp transmission schedule, such as that of FIG. 2, in accordance with one or more embodiments.

In one or more embodiments, the Doppler bin maxima array generated at block 810 may be used to generate a row of a coherently integrated range-Doppler map (RDM), such that the Doppler bin maxima arrays generated for each range bin of the range-Doppler antenna cube 602 may be combined to generate such a coherently integrated RDM. Herein, an RDM may be distinguished from an RDBM in that an RDBM includes a matrix or 2D array of binary values (e.g., 0's and 1's), while an RDM can include a matrix or 2D array of signal amplitudes. FIG. 9 shows an example of such a coherently integrated RDM 900. In the coherently integrated RDM 900 data from each TX channel is encoded according to respective DDM codes for each TX channel, such that each set of TX channel data is represented in the RDM 900 and is offset by a predetermined number of Doppler bins, where the offset is different for each TX channel (e.g., as defined by the corresponding DDM code). For example, data corresponding to a first TX channel, $TX_1$, representing a velocity of around −30 m/s is disposed in a Doppler bin 902. Data corresponding to a second TX channel, $TX_2$, representing a velocity of around −30 m/s is disposed in a Doppler bin 904, and is offset from the Doppler bin 902 by 50 bins. Data corresponding to a third TX channel, $TX_3$, representing a velocity of around −30 m/s is disposed in a Doppler bin 906, and is offset from the Doppler bin 902 by 120 bins. Data corresponding to a fourth TX channel, $TX_4$, representing a velocity of around −30 m/s is disposed in a Doppler bin 908, and is offset from the Doppler bin 902 by 230 bins.

Returning to FIG. 8, at block 810 of the method 800, the signal processor 110 generates a MAX map, such as the MAX map 610, based on the Doppler bin maxima array and the FFT output matrix. For example, the signal processor 110 may generate the MAX map by replacing cell values of the FFT output matrix corresponding to per-column maxima identified in the Doppler bin maxima array with a predetermined value, VAL, and replacing all other cell values with zero.

At block 812, the signal processor 110 generates an aligned MAX map, such as the aligned MAX map 612, based on the MAX map generated at block 810. For example, the signal processor 110 may generate the aligned MAX map by populating groups of columns of the aligned MAX map with columns of the MAX map generated at block 810 that correspond to the same Doppler bin across each TX channel, while accounting for predetermined offsets associated with each TX channel, where such offsets are known and result from the DDM scheme used when transmitting the chirps using the TX modules 118.

At block 814, the signal processor 110 generates a combined MAX, such as the combined MAX map 614, map based on per-row average values in each group of the aligned MAX map. For example, the signal processor 110 may generate the combined MAX map by taking a scalar product of length $N_{ch}$ for each row of each group of the aligned MAX map with coefficients of $(1/N_{ch})$.

At block 816, the signal processor 110 generates a filtered MAX map, such as the filtered MAX map 616, by applying a threshold to the cells of the combined MAX map. For example, the threshold may be $(K*VAL)/N_{ch}$, where VAL is the predetermined value used at block 810, K is a decoder threshold coefficient, and Now is the number of TX channels represented in the range-Doppler antenna cube 602. Cell values greater than are equal to the threshold result in an output of 1 for each of those cells in the filtered MAX map, while cell values less than the threshold result in an output of 0 for those cells in the filtered MAX map.

At block 818, the signal processor 110 generates a decoded RDBM row, such as the decoded RDBM row 618, based on the filtered MAX map. For example, the signal processor 110 may generate the decoded RDBM row by calculating the maxima of each column of the filtered MAX map.

At block 820, if all range bin matrices of the range-Doppler antenna cube 602 have been processed, the method 800 proceeds to block 822. Otherwise, if unprocessed range bin matrices remain, the method 800 returns to block 804, and the signal processor 110 extracts the next unprocessed range bin matrix of the range-Doppler antenna cube 602.

At block 822, the signal processor 110 outputs a decoded RDBM. For example, the signal processor 110 may generate the decoded RDBM by combining the decoded RDBM rows generated at block 818 for each range bin of the range-Doppler antenna cube.

For example, FIG. 10 shows a decoded RDBM 1000, which may be output by the MCU 104 of FIG. 1 at the block 822. The decoded RDBM 1000 corresponds to a decoded version of the coherently integrated RDM 900 of FIG. 9. Data points of the decoded RDBM 1000 correspond to peaks that are considered "valid" with respect to defined validity conditions applied by the signal processor 110 (e.g., based on the value of K and/or the amount of peak relaxation applied).

Embodiments of DDM decoding techniques described above may have an advantageously reduced probability of false alarm compared to conventional decoding techniques, without requiring the application of CFAR algorithms or other decoding algorithm that depend on such peak and threshold detection steps, which further advantageously improves decoding speed compared to such conventional decoding techniques. An analytical closed-form solution for the probability of false alarm, $P_{FA}$, exists for embodiments of the DDM decoding techniques described above.

For example, the $P_{FA}$ in one or more of the present embodiments depends on the decoding threshold, K, the number of TX channels, $N_{ch}$, and the number of angle bins used for coherent integration, $N_a$, which may be equal to the number of RX channels or RX antennas.

The $P_{FA}$ may be calculated by formulating the problem as a Bernoulli trial. The probability of noise surpassing the index-based detection threshold is equivalent for at least K out of $N_{ch}$ times the maximum value of the coherently integrated data set to be found in the same bin out of a total of $N_a$.

The probability for a noise-only acquisition to result in K matches is:

$$P_{FA,K} = N_a C_K^{N_{ch}} \left(\frac{1}{N_a}\right)^K \left(1 - \frac{1}{N_a}\right)^{N_{ch}-K}.$$

The probability for a noise-only acquisition to result in K+1 matches is:

$$P_{FA,K+1} = N_a C_{K+1}^{N_{ch}} \left(\frac{1}{N_a}\right)^{K+1} \left(1 - \frac{1}{N_a}\right)^{N_{ch}-K-1},$$

and so on. The probability of false alarm is the sum of all possible cases in which noise samples provide a larger (or equal) number of matches than the imposed threshold K:

$$P_{FA} = N_a \sum_{k=K}^{N_{ch}} C_K^{N_{ch}} \left(\frac{1}{N_a}\right)^K \left(1 - \frac{1}{N_a}\right)^{N_{ch}-K}$$

The equation above holds assuming that $2K > N_{ch}$, otherwise the equation needs to be adapted using the inclusion-exclusion principle. However, the assumption holds for values of K chosen in the interval $$\frac{N_{ch}}{2} < K \leq N_{ch}.$$

Unlike in traditional CFAR algorithms, there is no assumption being made regarding the distribution in the Range-Doppler dimension, and it is only assumed that each bin in the channel dimension is independent, and that it may be treated as a Bernoulli variable with outcome a positive outcome probability of $1/N_a$ and a negative outcome probability of $$\left(1 - \frac{1}{N_a}\right).$$

The $P_{FA}$ is set by modifying K, as $N_a$ and $N_{ch}$ are fixed for a given system. For a lower $P_{FA}$ the value of K is increased. However, this comes at the cost of reduced sensitivity to overlapping targets and may reduce detectability of valuable targets. Hence, based on the unambiguous velocity and use-case, a trade-off exists between the $P_{FA}$ and the probability of detection, $P_D$.

One way of improving both $P_{FA}$ and $P_D$ for low values of $N_{ch}$ (e.g., 4 TX channels), is to use more permissive value for K, that will ensure a proper decoding, and include CFAR detection to ensure a sufficiently low probability false alarm.

For large values of $N_{ch}$, CFAR detection not required, assuming excessive overlap is avoided by increasing the number of Doppler bins. For example, 1024 Doppler bins may be used for a system having 12 TX channels with a threshold of K=8, without requiring CFAR detection.

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in one or more embodiments of the depicted subject matter.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program. The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments described herein may be implemented entirely in hardware or in an implementation containing both hardware and software elements. In embodiments which use software, the software may include but is not limited to firmware, resident software, microcode, etc.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A radar system comprising:
a plurality of transmitter modules configured to transmit a plurality of transmit signals in accordance with a Doppler Division Multiplexing (DDM) scheme;
a plurality of receiver modules configured to receive reflections of the plurality of transmit signals reflected by at least one object and to generate digital signals based on the received reflections;
a signal processor configured to:
generate a range-Doppler antenna cube representing the digital signals, the range-Doppler antenna cube including at least a plurality of range bins and a plurality of Doppler bins;
for each range bin of the plurality of range bins of the range-Doppler antenna cube:
extract a range bin matrix from the range-Doppler antenna cube;
perform a Discrete Fourier transform (DFT) of each range-Doppler cell of the range bin matrix in a channel dimension to generate an output matrix;
determine peak locations in the output matrix;
compare, for each Doppler bin, associated peak locations across all transmit channels represented in the output matrix to identify location-matched peaks associated with the Doppler bin; and
generate a decoded range-Doppler bit map (RDBM) row based on the location-matched peaks; and
generate a decoded RDBM based on the decoded RDBM rows.

2. The radar system of claim 1, wherein the signal processor, to generate the decoded RDBM row, is further configured to:
generate, for each of the Doppler bins of the output matrix, a binary value indicating whether a quantity of location-matched peaks associated with that Doppler bin exceeds a predetermined threshold.

3. The radar system of claim 2, wherein the signal processor, to determine the peak locations of the output matrix, is further configured to:
for each particular Doppler bin of the output matrix:
determine a maximum value;
compare cell values of the particular Doppler bin to the determined maximum value;
in response to first cells of the particular Doppler bin having values greater than or equal to the determined maximum value, update the cell values of the first cells to be equal to a predetermined value; and
in response to second cells of the particular Doppler bin having values less than the determined maximum value, update the cell values of the second cells to be equal to zero; and
generate a first matrix based on the updated cell values for each particular Doppler bin of the output matrix.

4. The radar system of claim 3, wherein the signal processor, to compare the associated peak locations, is further configured to generate a second matrix that includes groups of Doppler bins, wherein each group of Doppler bins includes columns of the first matrix representing each of the transmit channels.

5. The radar system of claim 4, wherein the columns of each group of the second matrix, adjusted for transmit channel offsets in a Doppler dimension, correspond to the same unambiguous velocity, wherein the transmit channel offsets are defined according to associated DDM codes.

6. The radar system of claim 5, wherein the signal processor, to generate the decoded RDBM row, is further configured to generate a third matrix by calculating a scalar product of cells in each row of each group of the second matrix, wherein results of the scalar products for a given group of the second matrix form a corresponding column of the third matrix.

7. The radar system of claim 6, wherein the signal processor, to generate the third matrix, is further configured to apply, a coefficient of $1/N_{ch}$ to the result of each scalar product, where $N_{ch}$ is the number of transmit channels represented in the range-Doppler antenna cube.

8. The radar system of claim 7, wherein the signal processor, to generate the decoded RDBM row, is further configured to generate a fourth matrix by applying a threshold to each cell of the third matrix, such that cells of the third matrix having values greater than the threshold are set to 1 in the fourth matrix, and cells of the third matrix having values less than the threshold are set to 0 in the fourth matrix.

9. The radar system of claim 8, wherein the threshold is equal to the predetermined value.

10. The radar system of claim 8, wherein the threshold is less than the predetermined value.

11. The radar system of claim 8, wherein the signal processor, to generate the decoded RDBM row, is configured to:
generate the decoded RDBM row as an array of per-column maximum values of the fourth matrix.

12. A method comprising:
generating, by a signal processor of a radar system, a range-Doppler antenna cube representing digital signals corresponding to signals reflected by an object, the range-Doppler antenna cube including at least a plurality of range bins and a plurality of Doppler bins; and
generating, by the signal processor, a decoded range-Doppler bit map (RDBM) by, for each range bin of the plurality of range bins of the range-Doppler antenna cube:
extracting a range bin matrix from the range-Doppler antenna cube;
performing a Discrete Fourier transform of each range-Doppler cell of the range-Doppler antenna cube to generate an output matrix;
determining peak locations in each Doppler bin of the output matrix;
comparing, for each of the Doppler bins of the output matrix, associated peak locations across all transmit channels represented in the output matrix to identify location-matched peaks associated with the Doppler bin;
generating a decoded RDBM row based on the location-matched peaks in each Doppler bin; and
combining the decoded RDBM rows to generate the decoded RDBM.

13. The method of claim 12, wherein generating the decoded RDBM row further comprises:
generating, for each of the Doppler bins of the output matrix, a binary value indicating whether a quantity of location-matched peaks associated with that Doppler bin exceeds a predetermined threshold.

14. The method of claim 13, wherein determining the peak locations in each Doppler bin of the output matrix comprises:

for each particular Doppler bin of the output matrix:
determining a maximum value of the particular Doppler bin;
comparing cell values of the particular Doppler bin to the determined maximum value;
in response to first cells of the particular Doppler bin having values greater than or equal to the determined maximum value, updating the cell values of the first cells to be equal to a predetermined value; and
in response to second cells of the particular Doppler bin having values less than the determined maximum value, updating the cell values of the second cells to be equal to a predetermined value; and
generating a first matrix based on the updated cell values for each particular Doppler bin of the output matrix.

15. The method of claim 14, wherein comparing the associated peak locations further comprises:

generating a second matrix that includes groups of columns of the first matrix, wherein the columns of each group correspond to the same unambiguous velocity, adjusted for transmit channel offsets in a Doppler dimension, wherein the transmit channel offsets are defined according to associated Doppler Division Multiplexing (DDM) codes.

16. The method of claim 15, wherein generating the decoded RDBM row further comprises:

generating a third matrix by calculating a scalar product of cells in each row of each group of the second matrix, wherein results of the scalar products for a given group of the second matrix form a corresponding column of the third matrix; and
applying a coefficient of $1/N_{ch}$ to the result of each scalar product, where $N_{ch}$ is the number of transmit channels represented in the range-Doppler antenna cube.

17. The method of claim 16, wherein generating the decoded RDBM row further comprises:

generating a fourth matrix by applying a threshold to each cell of the third matrix, such that cells of the third matrix having values greater than the threshold are set to 1 in the fourth matrix and cells of the third matrix having values less than the threshold are set to 0 in the fourth matrix.

18. The method of claim 17, wherein the threshold is equal to the predetermined value.

19. The method of claim 17, wherein the threshold is less than the predetermined value.

20. The method of claim 17, wherein generating the decoded RDBM row further comprises:

generating the decoded RDBM row as an array of per-column maximum values of the fourth matrix.

* * * * *